United States Patent
Mire et al.

(10) Patent No.: US 12,038,915 B2
(45) Date of Patent: *Jul. 16, 2024

(54) DATABASE CREATION AND COLLISION REDUCTION

(71) Applicant: Capital One Services, LLC, McLean, VA (US)

(72) Inventors: Dennis J. Mire, Dallas, TX (US); Puneet Goyal, KA (IN); Siddharth Gupta, Lucknow (IN); Srinivas Kumar, Chennai (IN); Deepak Sundararaj, Puneet, TX (US); Oron Hazi, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,662

(22) Filed: Dec. 14, 2021

(65) Prior Publication Data

US 2022/0100747 A1 Mar. 31, 2022

Related U.S. Application Data

(63) Continuation of application No. 16/848,114, filed on Apr. 14, 2020, now Pat. No. 11,573,956, and a
(Continued)

(51) Int. Cl.
*G06F 16/242* (2019.01)
*G06F 9/54* (2006.01)
(Continued)

(52) U.S. Cl.
CPC ............ *G06F 16/2425* (2019.01); *G06F 9/54* (2013.01); *G06F 16/212* (2019.01);
(Continued)

(58) Field of Classification Search
None
See application file for complete search history.

(56) References Cited

U.S. PATENT DOCUMENTS

| | | | |
|---|---|---|---|
| 5,812,840 | A | 9/1998 | Shwartz |
| 5,822,750 | A | 10/1998 | Jou et al. |
| | | (Continued) | |

OTHER PUBLICATIONS

Jul. 8, 2021—(WO) International Search Report & Written Opinion—App. No. PCT/US2021/027023.
(Continued)

*Primary Examiner* — Dawaune A Conyers
(74) *Attorney, Agent, or Firm* — Banner & Witcoff, Ltd.

(57) ABSTRACT

A system, method, and computer-readable medium for proving feedback on database instructions, identifying, for example, existing patterns and providing suggested replacement instructions. This may have the effect of improving the efficiency of instructions used to create and/or manipulate databases. According to some aspects, these and other benefits may be achieved by parsing received instructions into an organizational structure, traversing the organizational structure for known patterns, and suggesting replacement patterns. In implementation, this may be effected by receiving one or more sets of known patterns and corresponding replacement patterns, parsing received instructions, comparing the known patterns with the parsed instructions, and providing suggested replacement patterns based on one or more known patterns matching the parsed instructions. A benefit of may include reducing Cartesian products during the merging of tables.

20 Claims, 18 Drawing Sheets

Related U.S. Application Data continuation of application No. 16/848,220, filed on Apr. 14, 2020, now Pat. No. 11,216,438, and a continuation of application No. 16/848,308, filed on Apr. 14, 2020, now Pat. No. 11,755,583.

(51) Int. Cl.
  *G06F 16/21* (2019.01)
  *G06F 16/22* (2019.01)
  *G06F 16/2455* (2019.01)
  *G06F 16/9032* (2019.01)

(52) U.S. Cl.
  CPC ...... *G06F 16/2282* (2019.01); *G06F 16/2456* (2019.01); *G06F 16/90324* (2019.01)

(56) References Cited

U.S. PATENT DOCUMENTS

| | | |
|---|---|---|
| 7,181,438 B1 | 2/2007 | Szabo |
| 7,707,547 B2 | 4/2010 | Colton et al. |
| 8,868,404 B1 | 10/2014 | Yancey et al. |
| 8,914,782 B2 | 12/2014 | Isard et al. |
| 10,019,259 B2 | 7/2018 | Araya et al. |
| 11,042,699 B1 | 6/2021 | Sayre et al. |
| 11,170,020 B2 * | 11/2021 | He .................. G06F 16/258 |
| 2005/0165766 A1 | 7/2005 | Szabo |
| 2006/0015483 A1 | 1/2006 | Gownder |
| 2007/0038618 A1 | 2/2007 | Kosciusko et al. |
| 2010/0005077 A1 | 1/2010 | Krishnamurthy et al. |
| 2011/0296391 A1 * | 12/2011 | Gass .................. G06F 8/72 |
| | | 717/168 |
| 2013/0262373 A1 * | 10/2013 | Rampson .............. G06F 40/197 |
| | | 707/E17.008 |
| 2016/0062753 A1 | 3/2016 | Champagne |
| 2018/0075104 A1 | 3/2018 | Oberbreckling et al. |
| 2018/0096001 A1 | 4/2018 | Soza |
| 2018/0129720 A1 | 5/2018 | Kim et al. |
| 2019/0118098 A1 | 4/2019 | Payzer et al. |
| 2019/0278777 A1 | 9/2019 | Malik et al. |
| 2020/0026790 A1 | 1/2020 | MacLean et al. |
| 2020/0192901 A1 | 6/2020 | Portisch et al. |
| 2021/0117437 A1 | 4/2021 | Gibson |
| 2021/0318995 A1 | 10/2021 | Portisch et al. |

OTHER PUBLICATIONS

Philipp Koehn; "Euoparl: A Parallel Corpus for Statistical Machine Translation" 2005; pp. 79-86 (Year 2005).
Apr. 15, 2024—(EP) Extended European Search Report—App No. 21788679.5.

* cited by examiner

FIG. 7

Initial Date Format: M/D/YY

Source Table

| RowID | Date |
|---|---|
| 1 | 1/31/2015 |
| 2 | 3/2/2015 |
| 3 | 3/10/2015 |
| 4 | 4/29/2015 |
| 5 | 3/14/2016 |
| 6 | 9/2/2016 |
| 7 | 12/24/2016 |
| 8 | 2/23/2017 |
| 9 | 4/10/2017 |
| 10 | 4/28/2017 |
| 11 | 6/25/2017 |
| 12 | 8/3/2017 |
| 13 | 8/29/2017 |
| 14 | 11/5/2017 |
| 15 | 4/1/2018 |
| 16 | 5/17/2018 |
| 17 | 7/20/2018 |
| 18 | 7/5/2019 |
| 19 | 12/2/2019 |
| 20 | 12/12/2019 |

Date Format Conversion: Initial to Final

Full Table Scan

| 1 |
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |
| 17 |
| 18 |
| 19 |
| 20 |

Final Date Format: YYYY-MM-DD

First Resultant Table

| RowID | Date |
|---|---|
| 1 | 2015-01-31 |
| 2 | 2015-03-02 |
| 3 | 2015-03-10 |
| 4 | 2015-04-29 |
| 5 | 2016-03-14 |
| 6 | 2016-09-02 |
| 7 | 2016-12-24 |
| 8 | 2017-02-23 |
| 9 | 2017-04-10 |
| 10 | 2017-04-28 |
| 11 | 2017-06-25 |
| 12 | 2017-08-03 |
| 13 | 2017-08-29 |
| 14 | 2017-11-05 |
| 15 | 2018-04-01 |
| 16 | 2018-05-17 |
| 17 | 2018-07-20 |
| 18 | 2019-07-05 |
| 19 | 2019-12-02 |
| 20 | 2019-12-12 |

Date Comparison: Final > Threshold?

Full Table Scan

| 21 |
| 22 |
| 23 |
| 24 |
| 25 |
| 26 |
| 27 |
| 28 |
| 29 |
| 30 |
| 31 |
| 32 |
| 33 |
| 34 |
| 35 |
| 36 |
| 37 |
| 38 |
| 39 |
| 40 |

Date after: 2017-01-01

Second Resultant Table

| RowID | Date |
|---|---|
| 8 | 2017-02-23 |
| 9 | 2017-04-10 |
| 10 | 2017-04-28 |
| 11 | 2017-06-25 |
| 12 | 2017-08-03 |
| 13 | 2017-08-29 |
| 14 | 2017-11-05 |
| 15 | 2018-04-01 |
| 16 | 2018-05-17 |
| 17 | 2018-07-20 |
| 18 | 2019-07-05 |
| 19 | 2019-12-02 |
| 20 | 2019-12-12 |

| Initial Date Format: M/D/YY | | | | | Date Comparison: Convert(Initial) > Threshold? | | | Date after: 2017-01-01 | |
|---|---|---|---|---|---|---|---|---|---|
| Source Table | | | Full Table Scan | | Partial Row Scan | | | Second Resultant Table | |
| RowID | Date | | | | | | | RowID | Date |
| 1 | 1/31/2015 | | 1 | | 1 | | | 8 | 2017-02-23 |
| 2 | 3/2/2015 | | 2 | | 2 | | | 9 | 2017-04-10 |
| 3 | 3/10/2015 | | 3 | | 3 | | | 10 | 2017-04-28 |
| 4 | 4/29/2015 | | 4 | | 4 | | | 11 | 2017-06-25 |
| 5 | 3/14/2016 | | 5 | | 5 | | | 12 | 2017-08-03 |
| 6 | 9/2/2016 | | 6 | | 6 | | | 13 | 2017-08-29 |
| 7 | 12/24/2016 | | 7 | | 7 | | | 14 | 2017-11-05 |
| 8 | 2/23/2017 | | 8 | | 8 | | | 15 | 2018-04-01 |
| 9 | 4/10/2017 | | 9 | | 9 | | | 16 | 2018-05-17 |
| 10 | 4/28/2017 | | 10 | | 10 | | | 17 | 2018-07-20 |
| 11 | 6/25/2017 | | 11 | | 11 | | | 18 | 2019-07-05 |
| 12 | 8/3/2017 | | 12 | | 12 | | | 19 | 2019-12-02 |
| 13 | 8/29/2017 | | 13 | | 13 | | | 20 | 2019-12-12 |
| 14 | 11/5/2017 | | 14 | | 14 | | | | |
| 15 | 4/1/2018 | | 15 | | 15 | | | | |
| 16 | 5/17/2018 | | 16 | | 16 | | | | |
| 17 | 7/20/2018 | | 17 | | 17 | | | | |
| 18 | 7/5/2019 | | 18 | | 18 | | | | |
| 19 | 12/2/2019 | | 19 | | 19 | | | | |
| 20 | 12/12/2019 | | 20 | | 20 | | | | |

FIG. 8

| Initial Date Format: M/D/YY |
|---|

Source Table

| RowID | Date |
|---|---|
| 1 | 1/31/2015 |
| 2 | 3/2/2015 |
| 3 | 3/10/2015 |
| 4 | 4/29/2015 |
| 5 | 3/14/2016 |
| 6 | 9/2/2016 |
| 7 | 12/24/2016 |
| 8 | 2/23/2017 |
| 9 | 4/10/2017 |
| 10 | 4/28/2017 |
| 11 | 6/25/2017 |
| 12 | 8/3/2017 |
| 13 | 8/29/2017 |
| 14 | 11/5/2017 |
| 15 | 4/1/2018 |
| 16 | 5/17/2018 |
| 17 | 7/20/2018 |
| 18 | 7/5/2019 |
| 19 | 12/2/2019 |
| 20 | 12/12/2019 |

| Format Conversion |
|---|

| Full Table Scans |
|---|
| 1 |
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |
| 17 |
| 18 |
| 19 |
| 20 |

| Final Date Format: YYYY-MM-DD |
|---|

First Resultant Table

| RowID | Date |
|---|---|
| 1 | 2015-01-31 |
| 2 | 2015-03-02 |
| 3 | 2015-03-10 |
| 4 | 2015-04-29 |
| 5 | 2016-03-14 |
| 6 | 2016-09-02 |
| 7 | 2016-12-24 |
| 8 | 2017-02-23 |
| 9 | 2017-04-10 |
| 10 | 2017-04-28 |
| 11 | 2017-06-25 |
| 12 | 2017-08-03 |
| 13 | 2017-08-29 |
| 14 | 2017-11-05 |
| 15 | 2018-04-01 |
| 16 | 2018-05-17 |
| 17 | 2018-07-20 |
| 18 | 2019-07-05 |
| 19 | 2019-12-02 |
| 20 | 2019-12-12 |

| Date Comparison: Final > Threshold$_1$? |
|---|

| Full Table Scans |
|---|
| 21 |
| 22 |
| 23 |
| 24 |
| 25 |
| 26 |
| 27 |
| 28 |
| 29 |
| 30 |
| 31 |
| 32 |
| 33 |
| 34 |
| 35 |
| 36 |
| 37 |
| 38 |
| 39 |
| 40 |

Second Resultant Table

| RowID | Date |
|---|---|
| 8 | 2017-02-23 |
| 9 | 2017-04-10 |
| 10 | 2017-04-28 |
| 11 | 2017-06-25 |
| 12 | 2017-08-03 |
| 13 | 2017-08-29 |
| 14 | 2017-11-05 |
| 15 | 2018-04-01 |
| 16 | 2018-05-17 |
| 17 | 2018-07-20 |
| 18 | 2019-07-05 |
| 19 | 2019-12-02 |
| 20 | 2019-12-12 |

| Date Comparison: Final < Threshold$_2$? |
|---|

| Full Table Scans |
|---|
| 41 |
| 42 |
| 43 |
| 44 |
| 45 |
| 46 |
| 47 |
| 48 |
| 49 |
| 50 |
| 51 |
| 52 |
| 53 |
| 54 |

| Date between: 2017-01-01 & 2018-01-01 |
|---|

Third Resultant Table

| RowID | Date |
|---|---|
| 8 | 2017-02-23 |
| 9 | 2017-04-10 |
| 10 | 2017-04-28 |
| 11 | 2017-06-25 |
| 12 | 2017-08-03 |
| 13 | 2017-08-29 |
| 14 | 2017-11-05 |

FIG. 9

| Initial Date Format: M/D/YY | | Format Conversion | | Date Comparison: Convert(Initial) > Threshold$_1$ & < Threshold$_2$? | | Date between: 2017-01-01 & 2018-01-01 | |
|---|---|---|---|---|---|---|---|

| Source Table | | Full Table Scans | First Threshold Row Scan | Second Threshold Row Scan | Second Resultant Table | |
|---|---|---|---|---|---|---|
| RowID | Date | | | | RowID | Date |
| 1 | 1/31/2015 | 1 | | | | |
| 2 | 3/2/2015 | 2 | | | | |
| 3 | 3/10/2015 | 3 | | | | |
| 4 | 4/29/2015 | 4 | | | | |
| 5 | 3/14/2016 | 5 | | | | |
| 6 | 9/2/2016 | 6 | | | | |
| 7 | 12/24/2016 | 7 | | | | |
| 8 | 2/23/2017 | 8 | 1 | 21 | 8 | 2017-02-23 |
| 9 | 4/10/2017 | 9 | 2 | 22 | 9 | 2017-04-10 |
| 10 | 4/28/2017 | 10 | 3 | 23 | 10 | 2017-04-28 |
| 11 | 6/25/2017 | 11 | 4 | 24 | 11 | 2017-06-25 |
| 12 | 8/3/2017 | 12 | 5 | 25 | 12 | 2017-08-03 |
| 13 | 8/29/2017 | 13 | 6 | 26 | 13 | 2017-08-29 |
| 14 | 11/5/2017 | 14 | 7 | 27 | 14 | 2017-11-05 |
| 15 | 4/1/2018 | 15 | 8 | 28 | | |
| 16 | 5/17/2018 | 16 | 9 | 29 | | |
| 17 | 7/20/2018 | 17 | 10 | 30 | | |
| 18 | 7/5/2019 | 18 | 11 | 31 | | |
| 19 | 12/2/2019 | 19 | 12 | 32 | | |
| 20 | 12/12/2019 | 20 | 13 | 33 | | |
| | | | 14 | 34 | | |
| | | | 15 | 35 | | |
| | | | 16 | 36 | | |
| | | | 17 | 37 | | |
| | | | 18 | 38 | | |
| | | | 19 | 39 | | |
| | | | 20 | 40 | | |

FIG. 10

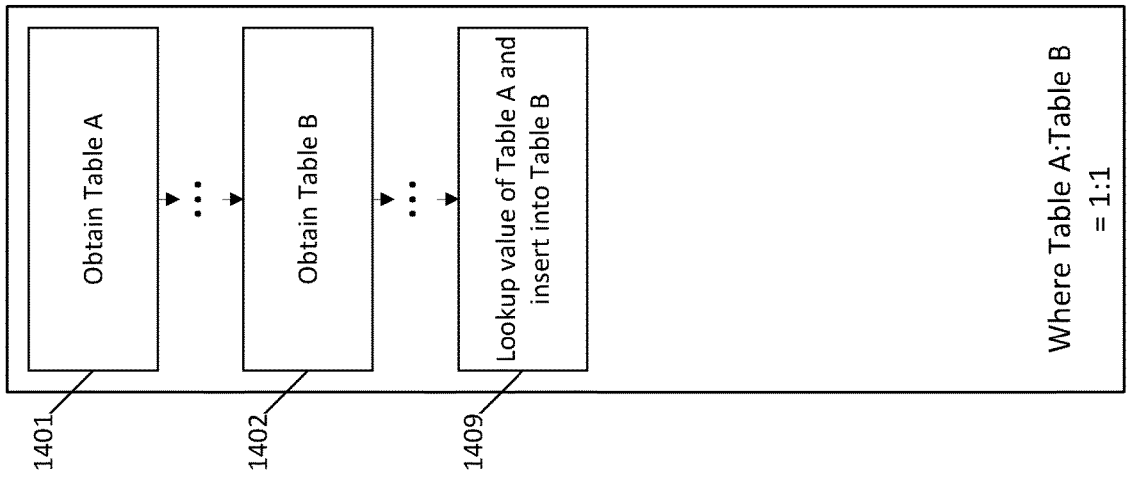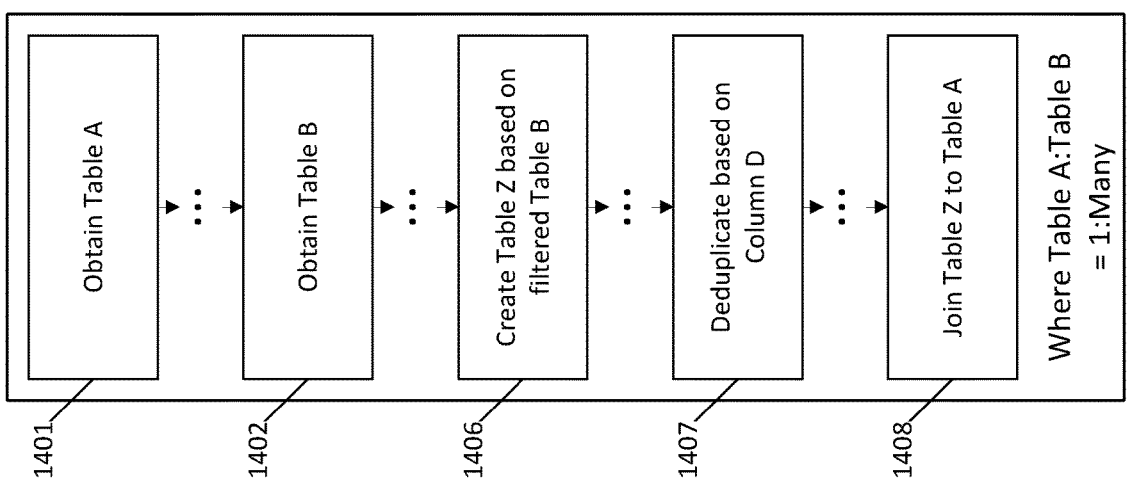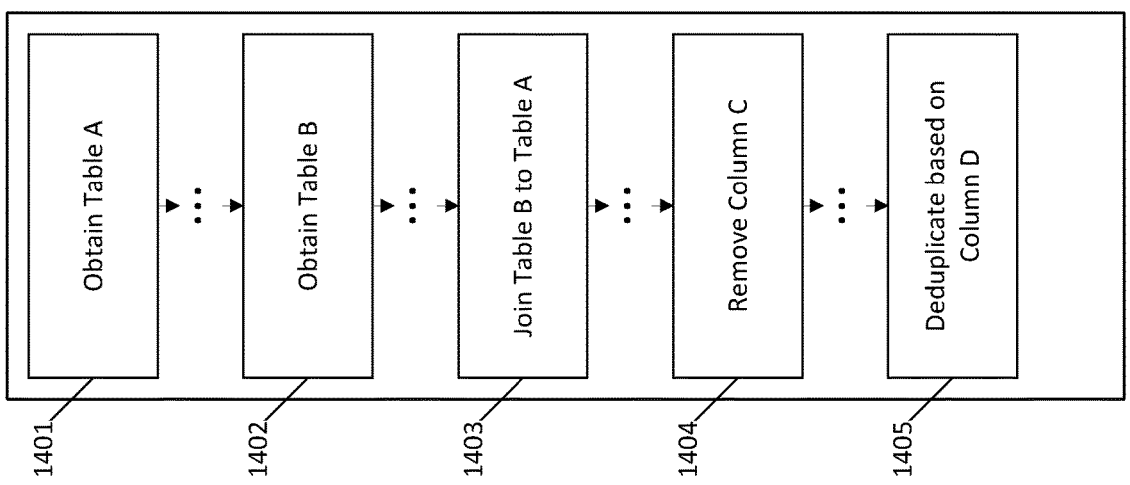

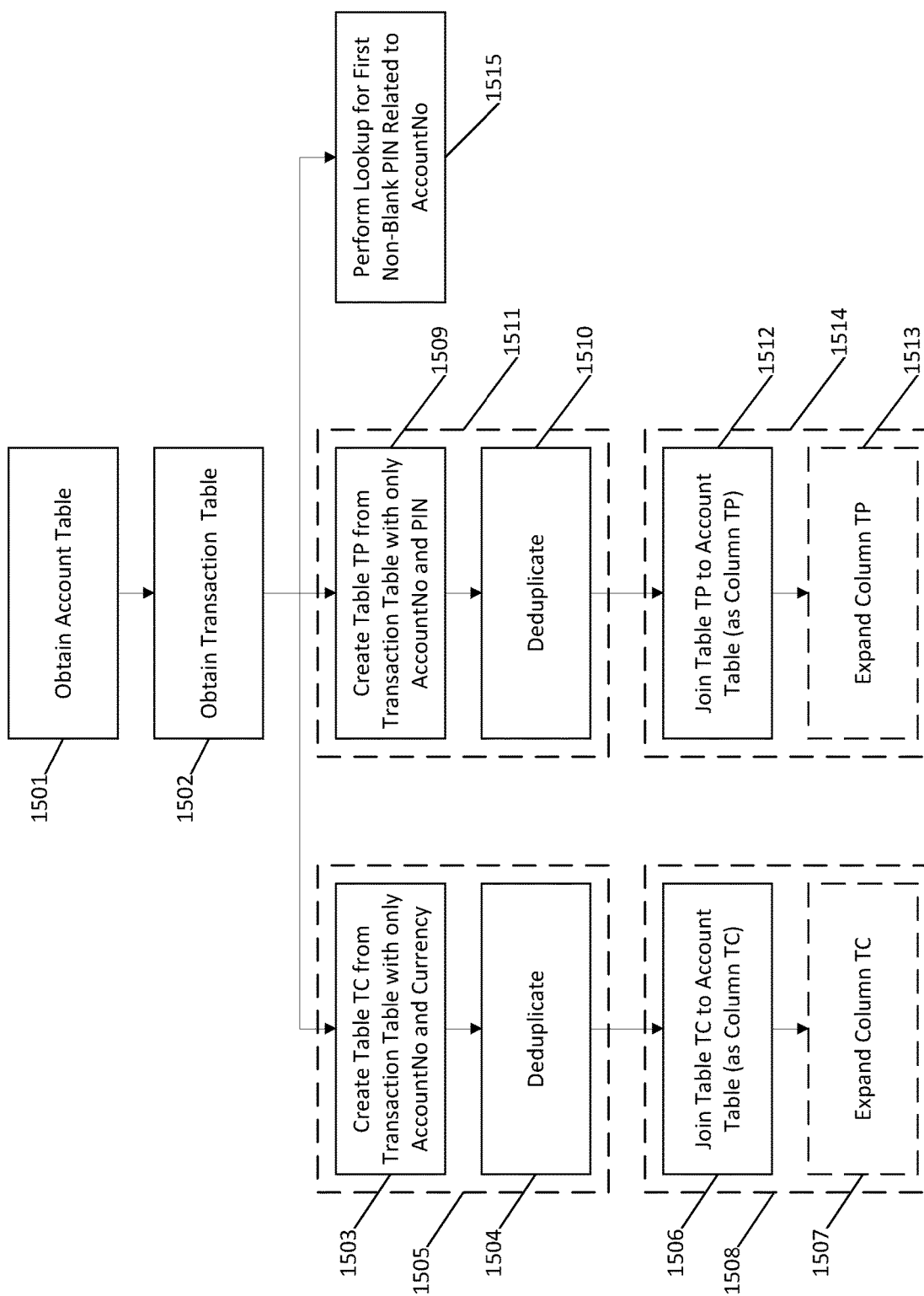

DATABASE CREATION AND COLLISION REDUCTION

RELATED APPLICATIONS

This application is a continuation of U.S. patent application Ser. No. 16/848,220, by Dennis J. Mire, Puneet Goyal, Siddharth Gupta, Srinivas Kumar, Deepak Sundararaj, and Oron Hazi, entitled "Database Creation and Collison Reduction," filed Apr. 14, 2020. This application is also a continuation of U.S. patent application Ser. No. 16/848,114, by Dennis J. Mire, Puneet Goyal, Siddharth Gupta, Srinivas Kumar, Deepak Sundararaj, and Oron Hazi, entitled "Database Creation using Table Type Information," filed on Apr. 14, 2020. Further, this application is a continuation of U.S. patent application Ser. No. 16/848,308, by Dennis J. Mire, Puneet Goyal, Siddharth Gupta, Srinivas Kumar, Deepak Sundararaj, and Oron Hazi, entitled "Database Creation using Domain-Specific Information," filed on Apr. 14, 2020. The entireties of the related applications are incorporated by reference herein for all purposes.

FIELD OF USE

Aspects of the disclosure relate generally to databases. More specifically, aspects of the disclosure may provide for enhanced creation and maintenance of one or more databases.

BACKGROUND

As companies grow and change, backend systems need to change as well. With advances in cloud-based storage techniques, companies are increasingly transitioning from legacy relational databases, often partitioned per geographic area, to cloud-based databases. Some approaches to transition legacy databases to cloud-based databases have included copying the structure and content of each legacy database to a new cloud-based database. This one-for-one approach does not always take advantage of the cloud-based storage platforms as conventional partitions may still exist in the copies of the databases where those partitions are meaningless in the cloud-based environment. Additionally, based on the volume of data to be moved to the cloud-based environment, the underlying process may be protracted in length as massive databases are joined with similarly massive databases, the resulting joining operations growing exponentially with the number of columns and rows to be moved.

Aspects described herein may address these and other problems, and generally improve the quality, efficiency, and speed of transitioning database systems by offering improved processes for conducting these transitions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for proving feedback on database instructions, identifying, for example, existing patterns and providing suggested replacement instructions. This may have the effect of improving the efficiency of instructions used to create and/or manipulate databases. According to some aspects, these and other benefits may be achieved by parsing received instructions into an organizational structure, traversing the organizational structure for known patterns, and suggesting replacement patterns. In implementation, this may be effected by receiving one or more sets of known patterns and corresponding replacement patterns, parsing received instructions, comparing the known patterns with the parsed instructions, and providing suggested replacement patterns based on one or more known patterns matching the parsed instructions. A benefit of may include reducing Cartesian products during the merging of tables.

Further aspects described herein may provide for preventing incorporation of overlapping replacement patterns into revised database instructions. This may have the effect of minimizing adoption of different suggestions that create inoperable database instructions. According to some aspects, these and other benefits may be achieved by receiving the user's selected replacement patterns, inserting known items for variables in the selected replacement patterns, parsing the new instructions, and comparing the parsed new instructions against the patterns. In implementation, this may be effected by recursively checking the parsed new instructions to determine whether the user's selected replacement instructions, when combined with the original instructions, result in one or more patterns that complicate the instructions or render them inoperable.

Further aspects described herein may provide for, in addition to suggesting replacement patterns, translating between SQL-based instructions into JSON-based equivalents for creating a database. These aspects may further incorporate domain-specific information into the initial database instructions, where the domain-specific information identifies replacement properties for existing properties associated with one or more tables of the database referenced in the initial database instructions.

More particularly, some aspects described herein may provide method for identifying replacement database instructions. The method may comprise a computer-implemented method for receiving a first instructions file comprising instructions to generate content, based on content of a first table and a second table, as one or more columns of a third table; receiving metadata corresponding to each of the first table and the second table; parsing the first instructions file to identify an organizational structure of a plurality of statements each configured to operate on the content of one or more of the first and second tables; determining, for at least one of the statements, of the plurality of statements, that joins the first table and the second table, a type of relationship between the first table and the second table; retrieving a collection of known patterns and associated recommended replacement patterns, wherein the known patterns comprise identification of statements, wherein the known patterns further comprise organizational structures of the statements; identifying, based on the determined type of relationship and the first instructions file, one or more patterns of the statements in the organizational structure that correspond to at least one of the known patterns; generating a first results file comprising the identified one or more patterns, one or more suggested modifications to the identified one or more patterns, and a textual explanation of the one or more suggested modifications; and outputting the first results file.

According to some embodiments, the determining the type of relationship may comprise identifying the type of relationship as one of: one-to-one; one-to-many; or manyto-many. The parsing the first instructions file to identify the organizational structure of statements may further comprise determining whether the first instructions file includes an iterative query; and determining, based on whether the first instructions file includes an iterative query, which columns of the first table and which columns of the second table are part of the iterative query. The identifying one or more patterns of the statements in the organizational structure that correspond to at least one of the known patterns of statements may further comprise determining the first instructions file includes a first set of SQL statements joining two one-to-many iterative tables, and the generating the first results file may further comprise providing the first set of SQL statements joining two one-to-many iterative tables; and providing a suggested modification including a second set of SQL statements joining the two one-to-many iterative tables. The first results file may be a JSON file, and the outputting the first results file may be a transmission in response to a call over an application programming interface (API). The parsing the first instructions file to identify the organizational structure may comprise parsing the first instructions file to create a first tree of statements. The parsing may further comprise identifying, in the first tree, one or more patterns that correspond to at least one of the known patterns. The parsing may further comprise calling a first parsing function, via an application programming interface, and including the first instructions file as part of the call to the first parsing function. The method may further comprise obtaining a first schema associated with the first table; and obtaining a second schema associated with the second table, wherein identifying, based on the metadata and the first instructions file, one or more patterns of the statements in the organizational structure that correspond to at least one of the known patterns further comprises identifying the one or more patterns based on the first instructions file, the first schema, and the second schema. The identifying, based on the first instructions file, the first schema, and the second schema, the one or more patterns may further comprise classifying a type of relationship between a first column of the first table and a second column of the second table as one of a one-to-one relationship, a one-to-many relationship, or a many-to-many relationship.

Further, some aspects described herein may provide method for detecting conflicting changes to the database instructions. The method may comprise a computer-implemented method for receiving a first instructions file comprising instructions to generate content, based on content from a first table, as one or more columns of a second table; parsing the first instructions file to identify an organizational structure of a plurality of statements each configured to operate on the content of the first table; retrieving a collection of known patterns and associated recommended replacement patterns, wherein the known patterns comprise identification of statements, wherein the known patterns further comprise organizational structures of the statements; identifying, in the first instructions file, one or more patterns of the statements in the organizational structure that correspond to at least one of the known patterns; generating a first results file including the identified one or more patterns and one or more suggested modifications to the identified one or more patterns; outputting the first results file; receiving a first user input indicating a user's acceptance of the one or more suggested modifications; storing, as a second results file, a first list of the first user input; parsing, based on the first results file and the second results file, the first instructions file to identify overlapping modifications accepted by the user; identifying, to the user, the overlapping accepted modifications; receiving a second user input indicating a user's revised acceptance of the one or more suggested modifications; storing, as a third results file, a second list of the second user input; and generating, based on the first results file, the second results file, and the third results file, the one or more columns of the second table According to some embodiments, each of the first results file, the second results file, and the third results file are JSON files; parsing the first instructions file to identify overlapping modifications accepted by the user may further comprise identifying at least two accepted modifications that would independently result in a common change and may both be implemented; parsing the first instructions file to identify overlapping modifications accepted by the user may further comprise identifying at least two accepted modifications that would independently result in a common change and cannot both be implemented; parsing the first instructions file to identify the organizational structure may further comprise parsing the first instructions file to create a first tree of statements; identifying, in the first instructions file, one or more patterns of the statements in the organizational structure that correspond to at least one of the known patterns may further comprise identifying, in the first tree, one or more patterns that correspond to at least one of the known patterns; wherein parsing the first instructions file to identify overlapping modifications accepted by the user may further comprise identifying alternative modifications to a schema; parsing the first instructions file to identify an organizational structure may further comprise calling a first parsing function, via an application programming interface, and including the first instructions file as part of the call to the first parsing function; parsing the first instructions file to identify overlapping modifications accepted by the user may further comprise calling a second parsing function, via an application programming interface, and including the first instructions file, the first results file, and the second results file as part of the call to the second parsing function. According to further embodiments, the method may further comprise obtaining a first schema associated with the first table; and obtaining a second schema associated with the second table, wherein identifying, in the first instructions file, the one or more patterns in the organizational structure that correspond to at least one of the known patterns may further comprise identifying the one or more patterns based on the first instructions file, the first schema, and the second schema.

According to further embodiments, the identifying, based on the first instructions file, the first schema, and the second schema, the one or more patterns may further comprise classifying a type of relationship between a first column of the first table and a second column of the second table as one of a one-to-one relationship, a one-to-many relationship, or a many-to-many relationship.

According to yet further embodiments, the generating the one or more columns of the second table may further comprise combining the second file and the third file; selecting proposed modifications from the first file based on the combination of the second file and the third file; generating, based on the selected proposed modifications, the second table with the one or more columns; and storing the second table. According to further embodiments, the generating the one or more columns of the second table may further comprise retrieving the first table; combining the second file and the third file; selecting proposed modifications from the first file based on the combination of the second file and the third file; generating, based on the selected proposed modifications, the one or more columns of the second table; and storing the second table.

Further, some aspects described herein may provide method for converting files between a first language related to modifying databases and a second language associated with an application programming interface (API). The method may comprise a computer-implemented method for receiving a set of rules, at least one rule comprising: an identification of two or more input language components of a first language, wherein the language components comprise one or more of statements; an identification of an input order between the two or more input language components; an identification of input values used by the two or more input language components; one or more output language components; and one or more output values; translating, based on the set of rules, a first input file in the first language into a second input file in the second language, wherein translating the first input file comprises replacing input language components in the first language with corresponding input language components in the second language; exposing, as a service, a process that analyzes the second input file; receiving, via an application programming interface, a call in the second language with a payload of the second input file; retrieving a collection of known patterns and associated recommended replacement patterns, wherein the known patterns comprise identification of components, wherein the known patterns further comprise organizational structures of the components; analyzing, based on the call, the received second input file against the collection of known patterns; generating a first output file in the second language, wherein the first output file contains identified portions of the received second input file corresponding to at least one known pattern of components, associated recommended replacement patterns as suggested output language components, and the one or more output values; returning the first output file; and translating into the first language, based on the set of rules, the first output file in the second language into a second output file with the one or more associated recommended replacement patterns, and the one or more output values.

According to some embodiments, the first language may be structured query language (SQL) and the second language may be JavaScript. According to some embodiments, returning the first output file includes at least one of: returning, via the application programming interface, an identification of the first output file for subsequent downloading, or sending, via the application programming interface, the first output file. According to some embodiments, the set of rules comprises rules for optimizing files in the first language. According to some embodiments, the set of rules comprises organization-specific rules regarding data substitutions to be added to the first input file. According to some embodiments, the method may further comprise receiving a new rule; deactivating the service; adding the new rule to the set of rules to generate a new set of rules; and activating a new service including the new set of rules. According to some embodiments, the processing the first input file based on the set of rules may further comprise processing the first input file as a text file.

According to some embodiments, the processing the first input file based on the set of rules may further comprise receiving the first input file, wherein the first input file comprising instructions to generate content, based on content of a first table, as one or more columns of a second table; parsing the first input file to identify an organizational structure of a plurality of statements each configured to operate on the content of the first table; retrieving the set of rules, the set of rules comprising a collection of second known patterns in the first language and second replacement patterns in the second language, wherein the second known patterns include identification of statements and orders of the statements; identifying, in the first input file, one or more patterns of the statements in the organizational structure that correspond to at least one of the second known patterns; and generating, based on the identification, the second input file with the second replacement patterns and the one or more output values. According to some embodiments, wherein the second input file is a JSON file. According to some embodiments, the method may further comprise obtaining a first schema associated with the first table; and obtaining a second schema associated with the second table, wherein identifying, in the first input file, one or more patterns of the statements in the organizational structure that correspond to at least one of the known patterns may further comprise identifying, based on the first input file, the first schema, and the second schema, the one or more patterns of the statements in the organizational structure that correspond to at least one of the known patterns. According to some embodiments, the identifying, based on the first input file, the first schema, and the second schema, the one or more patterns may further comprise classifying a type of relationship between a first column of the first table and a second column of the second table as one of a one-to-one relationship, a one-to-many relationship, or a many-to-many relationship, wherein the second column is a column of the one or more columns of the second table.

Further, some aspects described herein may provide method for converting files between a first language related to modifying databases and a second language associated with an application programming interface (API) and further including instructions to modify properties of database. The method may comprise receiving instructions, in a first language for a first input file comprising at least one table, that modify one or more properties of the first input file from an initial set of properties to a modified set of properties; receiving a set of rules, at least one rule comprising: an identification of two or more input language components of the first language, wherein the language components comprise one or more of statements; an identification of an input order between the two or more input language components; an identification of input values used by the two or more input language components; one or more output language components; and one or more output values; translating, based on the set of rules, the first input file in the first language into a second input file in the second language, wherein translating the first input file comprises replacing input language components in the first language with corresponding input language components in the second language; exposing, as a service, a process that analyzes the second input file; receiving, via an application programming interface, a call in the second language with a payload of the second input file; retrieving a collection of known patterns and associated recommended replacement patterns, wherein the known patterns comprise identification of components, wherein the known patterns further comprise organizational structures of the components; analyzing, based on the call, the received second input file against the collection of known patterns; generating a first output file in the second language, wherein the first output file contains identified portions of the received second input file corresponding to at least one known pattern of components, associated recommended replacement patterns as suggested output language components, and the one or more output values; returning the first output file; and translating into the first language, based on the set of rules, the first output file in the second language into a second output file with the one or more associated recommended replacement patterns, and the one or more output values.

According to some embodiments, the user instructions to modify one or more properties may further comprise modifying a name of a column of the first input file or modifying a schema of the first input file. According to some embodiments, the table of the first input file may have an initial table type of one of: Type 0: retain original table; Type 1: overwrite table; Type 2: add new row table; Type 3: add new attribute table; Type 4: add history table; and Type 6: combined table; and wherein the user instructions to modify one or more properties further comprise: modifying an identification of a table type from the initial table type to another table type. According to some embodiments, the first language is structured query language (SQL) and the second language is JavaScript. According to some embodiments, returning the second file includes at least one of: returning, via the application programming interface, an identification of the second file for subsequent downloading, or sending, via the application programming interface, the second file. According to some embodiments, the set of rules may comprise rules for optimizing files in the first language or organization-specific rules regarding data substitutions to be added to the first input file. According to some embodiments, the method may further comprise receiving a new rule; deactivating the service; adding the new rule to the set of rules to generate a new set of rules; and activating a new service including the new set of rules. According to some embodiments, processing the first input file based on the set of rules may further comprise processing the first input file as a text file. According to some embodiments, processing the first input file based on the set of rules may further comprise receiving the first input file, wherein the first input file comprising instructions to generate content, from a first table, a one or more columns of a second table; parsing the first input file to identify an organizational structure of a plurality of statements each configured to operate on the content of the first table; retrieving the set of rules, the set of rules comprising a collection of known patterns and associated recommended replacement patterns, wherein the known patterns include identification of statements and orders of the statements; identifying, in the first input file, one or more patterns of the statements in the organizational structure that correspond to at least one of the known patterns; and generating, based on the identification, a first results file including an identification of a first pattern in first input file with one or more suggested modifications to the first pattern. According to some embodiments, the first results file is a JSON file. According to some embodiments, the method may further comprise obtaining a first schema associated with the first table; and obtaining a second schema associated with the second table, wherein identifying, in the first input file, one or more patterns of the statements in the organizational structure that correspond to at least one of the known patterns may further comprise identifying, based on the first input file, the first schema, and the second schema, the one or more patterns, the one or more patterns of the statements in the organizational structure that correspond to at least one of the known patterns. According to some embodiments, the identifying, based on the first input file, the first schema, and the second schema, the one or more patterns may further comprise classifying a type of relationship between a first column of the first table and a second column of the second table as one of a one-to-one relationship, a one-to-many relationship, or a many-to-many relationship, wherein the second column is a column of the one or more columns of the second table.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7 depicts an example of operations based on checking all rows before comparing content in each row;

FIG. 8 depicts an example of operations based on checking content in a row while traversing all rows in a source table;

FIG. 9 depicts another example of operations based on checking all rows before comparing content in each row;

FIG. 10 depicts another example of operations based on checking content in a row while traversing all rows in a source table;

FIG. 14A depicts a pattern of operations. FIG. 14B depicts a first suggested alternative to the pattern of FIG. 14A. FIG. 14C depicts a second suggested alternative to the pattern of FIG. 14A;

FIG. 15 depicts replacement operations from FIGS. 14B and 14C being applied to the examples of FIGS. 11 and 12;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving creation and/or modification of a target database based on content from one or more source databases. As discussed further herein, this combination of features may allow for efficient creation of consolidated databases.

Before discussing these concepts in greater detail, however, several examples of a computing device that may be used in implementing and/or otherwise providing various aspects of the disclosure will first be discussed with respect to FIG. 1.

Figure 1:
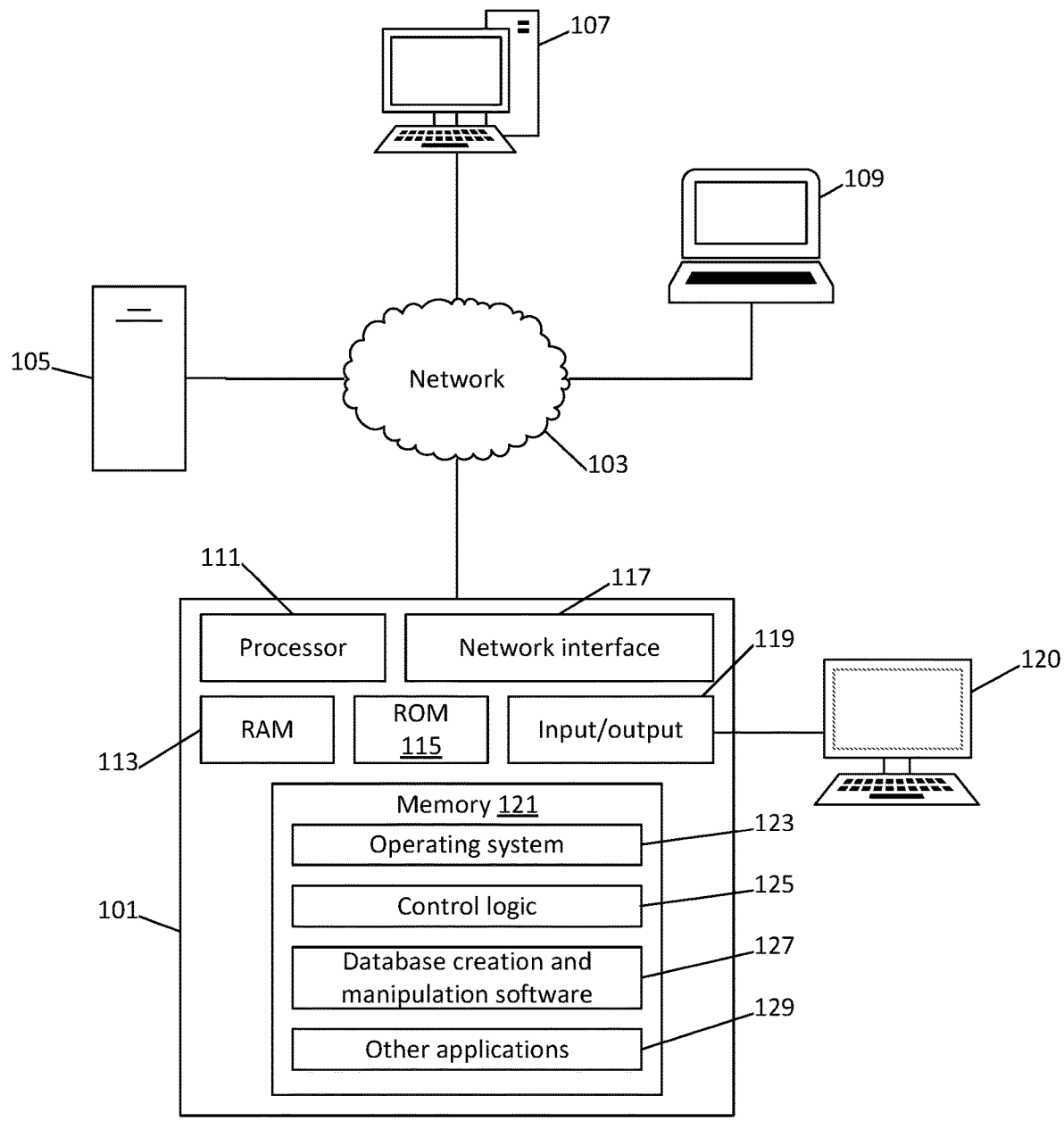
FIG. 1 depicts an example of a computing device and system architecture that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media. Additionally or alternatively, computing device 101 and/or the network nodes 105, 107, and 109 may be a server hosting one or more databases.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, database creation and manipulation software 127 and other applications 129. Control logic 125 may be incorporated in and may be a part of database creation and manipulation software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices, which may be used to implement some aspects as discussed further below, discussion will now turn to a method for creating and/or modifying a target database with content from one or more source databases.

Figure 2:
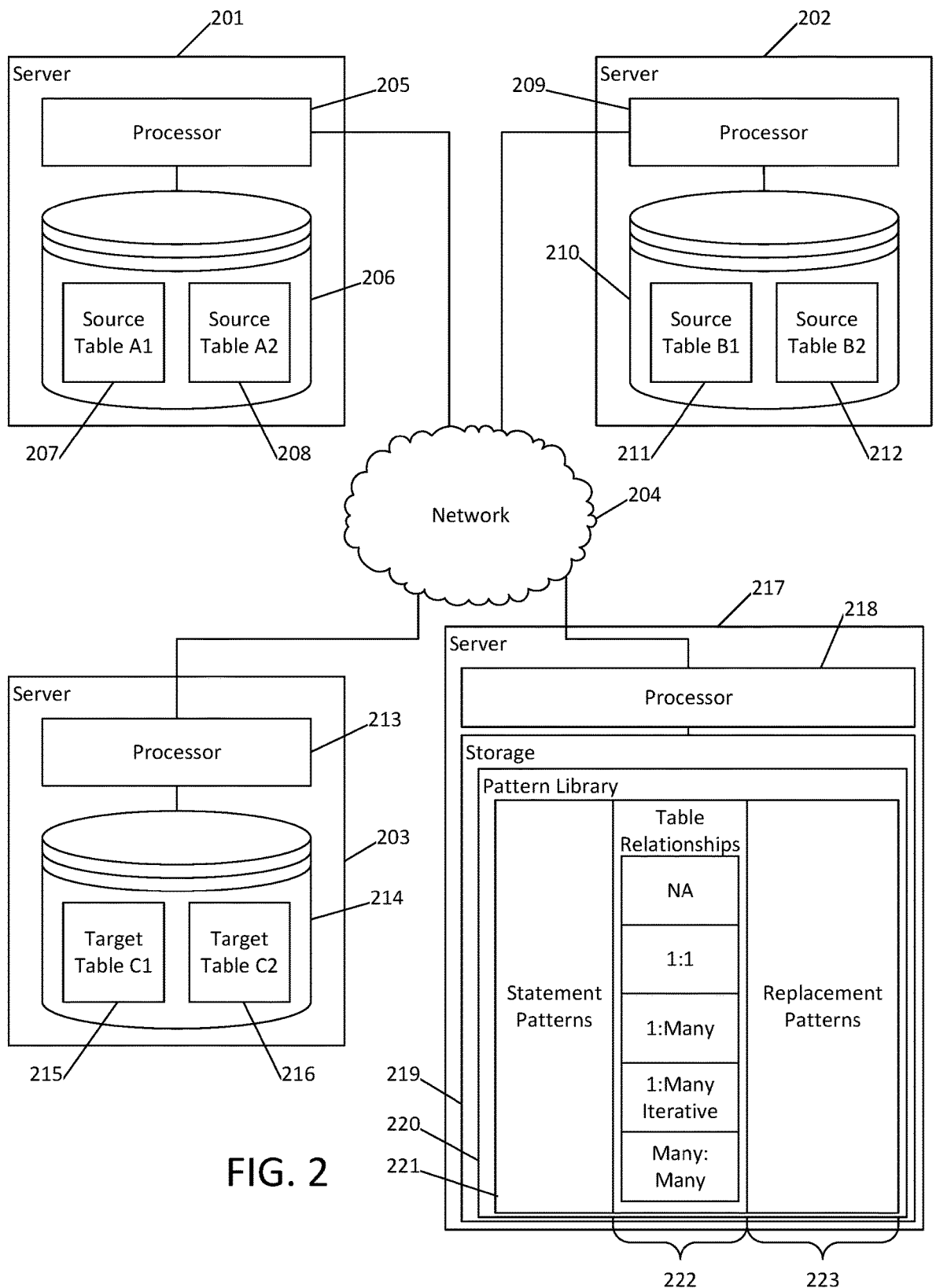
FIG. 2 depicts an example of a network comprising servers and databases.

FIG. 2 depicts an example of a network of two or more servers each supporting one or more tables. A server 201, a server 202, a server 203, and a server 217 may be connected to each other via network 204. Network 204 may be represented as a single network but may comprise combinations of other networks or subnetworks.

The server 201 may include one or more processors 205 and a database 206 comprising one or more source tables (e.g., a source table A1 207 and a source table A2 208). The server 202 may include one or more processors 209 and a database 210 comprising one or more source tables (e.g., a source table B1 211 and a source table B2 212). The server 203 may include one or more processors 213 and a database 214 comprising one or more target tables (e.g., a target table C1 215 and a target table C2 216). The server 217 may include one or more processors 218 and a storage 219 comprising one or more pattern libraries 220. The pattern libraries may include a number of database statement patterns 221, criteria 222 relating the two or more source tables to each other, and one or more replacement patterns 223. The statement patterns 221 may include one or more individual operations or groups of operations in a specific order. For example, individual operation may include a cross join operation (e.g., often written as CROSS JOIN, relating to obtaining a Cartesian product C of all rows A in a first table and all rows B in a second table, where the resulting number of rows C=A×B). In another example, an individual operation may include checking for all dates greater or equal to a specific date (e.g., filter ([Date])≥Jan. 1, 2019). An example of a group of operations may include joining two tables, removing columns, and de-duplicating contents of one or more remaining columns. Another example of a group of operations may include joining a first pair of tables, joining a third table, and filtering on content joined from the third table.

The criteria 222 relating the tables may include one or more categories of relationships between the tables including, but not limited to, a 1:1 relationship, a Many:Many relationship, a 1:Many relationship, and a 1:Many iterative relationships. In a 1:1 relationship, one value in an identified column of a first table is linked to at most one value in an identified column of a second table. In a Many:Many relationship, duplicate values in the identified column of the first table may be linked to multiple values in the identified column of the second table. In a 1:Many relationship, a value in the identified column of the first table may be linked to multiple values in the identified column of the second table but where each of the values in the identified column is linked to at most one value in the identified column of the first table. In a 1:Many iterative relationship, the two tables have the 1:Many relationship and further include one or more additional columns that contain additional data for existing rows instead of in the separate rows of the 1:Many tables. In short, in a 1:Many iterative relationship compared to a 1:Many relationship, the number of columns increase while the number of rows decrease for storing similar content. While the disclosure distinguishes between the 1:Many and the 1:Many iterative relationships, these may be combined as simply a 1:Many relationship.

Further, where a relationship between two or more tables is not applicable, no table relationship may be specified (represented in FIG. 2 by "NA" for "not applicable"). Where criterion 222 is "NA", that statement pattern may be applicable to all tables having the statement pattern identified in statement patterns 221.

The pattern library 220 may further include one or more suggested replacement patterns 223 relating to the statement patterns 221 and satisfying the table relationships 222. The one or more suggested replacement patterns may be substitute patterns to replace those of the statement patterns. For each replacement patterns, the effect on the resultant table may be the same but performed in at least one of a more efficient process or a less-error prone process. For example, if values in a column of the second table are to be added to columns of the first table and the combination of statements in a circuitous or inefficient process, the suggested replacement pattern may include a direct process or a more efficient process.

The steps applied to create and/or modify a table may be performed in any of processors 205, 209, 213, and/or 218. Additionally or alternatively, the processor 218 may be called via an application programming interface (API) exposed via network 204 to the other processors. Using the API, one or more of processors 205, 209, or 213 may request processor 218 to check an uploaded payload of one or more instruction files to, for example, determine whether any statements in the one or more instruction files may be replaced by replacement patterns 223. The returned content from the API may include one or more of a marked-up version of the original one or more instruction files, a set of replacement patterns, and/or a combination of the marked-up files along with combinations of replacement patterns. Further, based on a user's subsequent selection of one or more replacement patterns, the API may be called (with the user's selections included as payload) to check whether any of the user's selections overlap, e.g., creating redundant or conflicting instructions.

Target table C1 215 may be created based on content from one source table on one server (e.g., from source table A1 207 at server 201), based on content from two tables at a common server (e.g., from source table A1 207 and source table A2 208 at server 201), and/or based on tables from two or more servers (e.g., source table A1 207 from server 201 and source table B1 211 from server 202), or any combination thereof. Additionally, as some tables may be partitioned in time, geographical region, and other criteria, a target table may be created from a first set of rows from a first table and a second set of rows from a second table. Further, target tables may obtain content from other target tables (e.g., content from target table C1 215 may be used to create or append content to target table C2 216).

Figure 3:
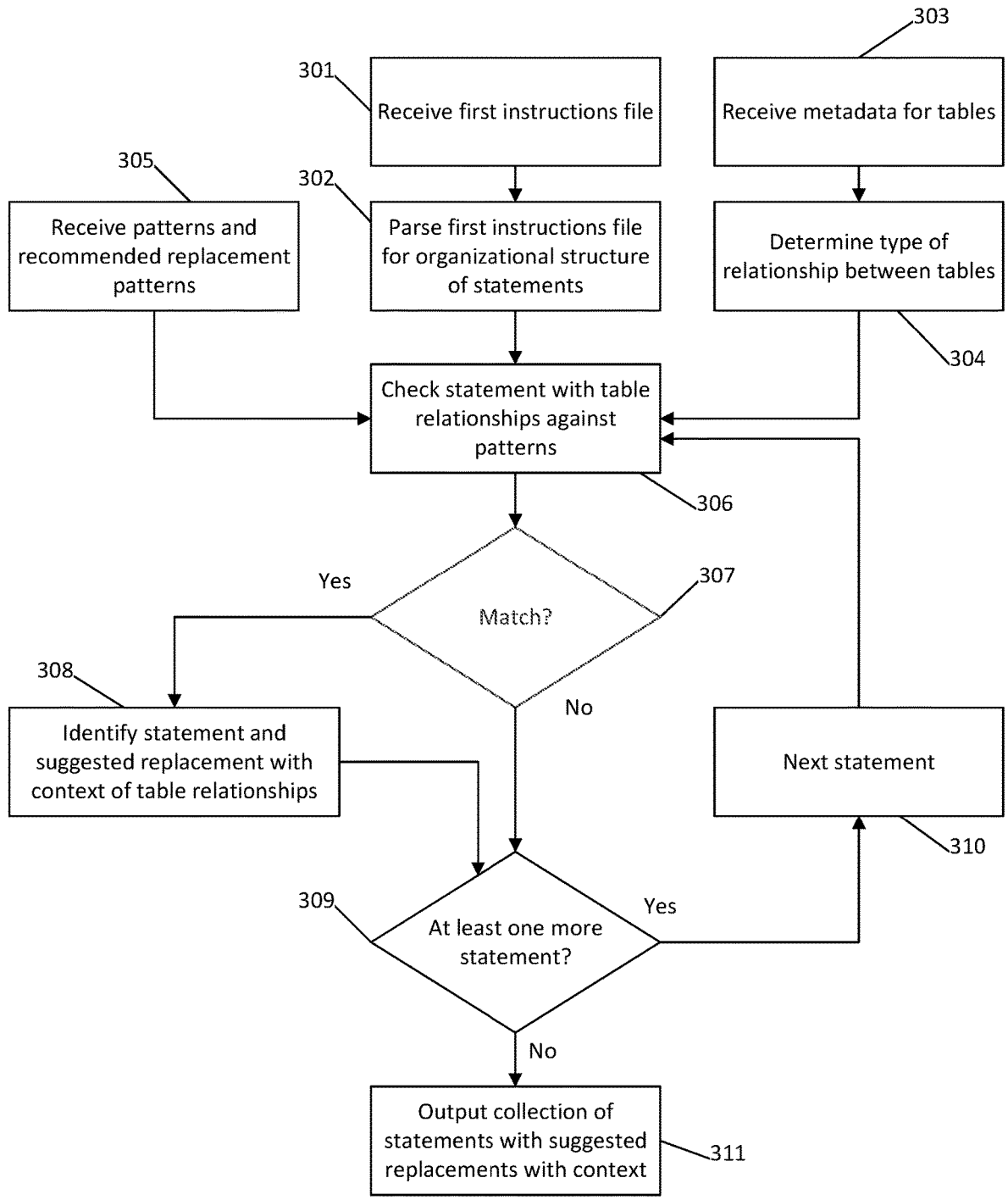
FIG. 3 depicts a flow chart for a method of combining data from source tables to create or modify a target table including checking relationships between tables.

FIG. 3 depicts a flow chart for a method of combining data from source tables to create or modify a target table including checking relationships between tables. In step 301, a processor (e.g., processor 218 of FIG. 2) receives a first instruction file. The first instructions file may include instructions to generated content in a target table in a database. The instructions file may reference one or more columns of one or more source tables to be added (e.g., JOINed or otherwise incorporated into) the target table. For example, where pulling content from a first table and second table, the target table may be referred to as a third table.

In step 302, the first instructions file is parsed to determine an organizational structure of the statements in the first instructions file. For example, parsing the first instructions file may include identifying operative functions and content associated with each function (if any). Some instructions files may be purely linear in that each step pertains solely to an immediately preceding step. Parsing linear instruction files may include identifying a functional step and replacing a reference and/or content with a variable. The resulting organizational structure of a linear file may be an ordered combination of instructions with a separate variable table.

A complex instructions file may exist in instructions that operate on different portions of a given table. For example, in a table of account numbers and transactions for a given day, a first merge operation may occur that, for each account number, JOINs a table of names and addresses for the account holder. A second merge operation may occur that, for each transaction, JOINs a table of merchant names and locations. A parsed version of the complex instructions file may result in a tree with nodes representing each operation.

In this example, because the second merge operation is not relying on a column added by the first merge operation, the node representing the second merge operation may have, as its parent, the same node as the first merge operation (in other words, a branching of the instructions). Further, with various merge operations including references to second or third source tables, the organizational structure may include multiple parents for any given node.

The variable table may identify the content of the original instructions file. The content may include, for instance, file locations, URLs, column names and/or column identifiers, dates/times, primary keys, foreign keys, index identifiers, and the like. The functional steps may include equations, comparisons and table operations including but not limited to various JOIN or MERGE operations, de-duplication, duplication, filling up and/or down, expanding, aggregating, and/or other operations.

In step 303, metadata for the tables (e.g., types of tables, numbers of columns, numbers of rows, datatypes of columns, and the like) is received. The table types (e.g., tables that track Slowly Changing Dimensions in the field of data management and/or data warehousing) may include one or more of Type 0 (fact data—never changing attributes relating to durable values—e.g., dates of birth, initial credit scores, etc.), Type 1 (another type of fact data but includes changing fact data—overwrite old data with new data—e.g., current address of a customer or merchant), Type 2 (history data—add new row as tracking historical data—e.g., transaction history of a customer or merchant), Type 3 (add new attribute by preserving limited history—e.g., adding a column to track an immediately preceding location of a customer or a merchant), Type 4 (a history table of data and a history of how that data has changed), and Type 6 (a combined approach of using multiple tables together). Other variations and/or combinations are known and yet further table types are possible. This description is not intended to be limiting to only those above identified table types.

For example, a combination of columns from different tables to be combined may include one or more of, for an immutable fact table (e.g., a table Type 0 storing fact data), a customer identification number and a date. The customer identification number may include a numeric or alphanumeric code associated with that individual, a social security number, or other identification. The date may include a birth date, a first date of credit history, a first date when credit was provided to the customer, etc. Additionally, the instruction file may identify a specific set of columns as a template to be used for identifying and/or processing other columns.

In step 304, the relationship between the tables may be determined. For example, for a primary key of a first table linking to a foreign key of a second table, the tables may be in a 1:1, 1:Many, Many:Many, or 1:Many iterative relationship. Steps 303 and 304 are shown as step 304 following step 303. Alternatively or additionally, step 304 may precede step 303 or may occur simultaneously with (or even as part of) step 303. Further, Steps 301 and 302 may occur before, after, and/or during overlapping intervals with one or more of steps 303 and/or 304.

In step 305, patterns to be compared with the first instructions file along with one or more suggested replacement patterns are received. The retrieved patterns may comprise one or more operations and possibly including a variable used in the one or more operations. For example, a pattern relating to a merge operation may include a first node representing a current column of a current table. A second node may represent a column of a source table. A third node linking to each of the first and second nodes may be a JOIN operation identifying variables for the current column (e.g., "Q") of the current table (e.g., "R") and variables for the column (e.g., "S") of the source table (e.g., "T").

In step 306, statements from the first instructions file are compared with the specific table relationships against the patterns received in step 305. For example, the parsed version (from step 302) of the first instructions file may be compared with one or more patterns from step 305 to determine whether the given pattern appears in the parsed first instructions file. For example, the pattern may include sequential merge operations and possibly another operation or set of operations (e.g., duplicate, de-duplicate, filter, etc.). One or more replacement patterns may exist for a given pattern and those one or more replacement patterns may offer alternative approaches to the given pattern. For instance, a replacement pattern may switch the order of operations, create separate intermediate tables with selected columns, and/or other operations).

In step 307, if a match exists between a statement, the specific table relationships, and a given pattern, then the statement and one or more suggested replacement patterns within the context of the table relationships are identified in step 308. To assist the replacement, operations not following an identified pattern may be also grouped together as another variable and added in the replacement pattern when the replacement pattern is modified with the existing variables to provide an example of the resulting suggested replacement pattern in the context of the first instructions file.

If, in step 309, the processor determines that there is at least one more statement, the next statement is identified in step 310 and that statement is checked in step 306. If there is no match between a given statement and the patterns, the processor determines in step 309 whether at least one more statement is to be processed. If no more statements remain, the processor outputs a collection of statements with suggested replacements within the context of the identified statements in step 311.

In reviewing the first instructions file, context-relevant terms may be replaced with variables or other identifiers to permit easier comparison with known patterns. Later, when providing suggested replacement patterns, those variables or other identifies may be used to add the context into the suggested replacement patterns. For example, an INNER JOIN statements is described below with respect to an Account Table with the name AccountTable and a Transaction Table with the name TransactionTable:

FILE LOCATION
      \\Domain.com\Server\Folder\SubFolder\
    SELECT AccountTable.AccountNumber, AccountTable.FirstName, AccountTable.LastName, TransactionTable.AccountNumber, TransactionTable.TransactionDate, . . .
    FROM AccountTable
    INNER JOIN TransactionTable
    ON AccountTable.AccountNumber=TransactionTable.AccountNumber; . . .

Here, the names of the two tables and the relevant columns may be replaced during the checking operation of step 306 with variables as follows:

| Original Term | Term Type | Variable |
| --- | --- | --- |
| AccountTable | Table | A |
| AccountNumber | Column | B |
| FirstName | Column | C |

| Original Term | Term Type | Variable |
|---|---|---|
| LastName | Column | D |
| TransactionTable | Table | E |
| TransactionDate | Column | F |
| \\Domain.com\Server\Folder\SubFolder\ | String | G |

Substituting the variables for the context-specific terms in the above statements would result in the following:
FILE LOCATION G
SELECT A.B, A.C, A.C, A.D, E.B, E.F, . . .
FROM A
INNER JOIN B
ON A.B=E.B; . . .

Upon the user selecting a replacement pattern, the variables in the replacement pattern may be replaced with the corresponding original term and the replacement suggested in the context of the original to the user.

The first instructions file may be in a number of different languages related to creating and/or manipulating database. For example, the languages may include those related to databases including but not limited to Oracle, MySQL, Microsoft SQL Server, PostgreSQL, MongoDB, DB2, Microsoft Access, Redis, and others. The parsing operation 302 may retain the language of the first instructions file or may provide the first instructions file in a different language (e.g., text, JSON, or the like). The patterns and replacements may be in the same language of the first instructions file or may be in a different language. The comparison step 306 may compare, in the original language or the alternative language, the patterns with the parsed instructions file. For example, if both the patterns from step 305 and the parsed first instructions file from step 302 are in JSON, then the checking step 306 may compare JSON files.

Further, one or more of the operations of FIG. 3 may be located locally or remotely from a server. The server may use various techniques (including but not limited to one or more of a file transfer protocol (FTP), application programming interface (API) calls, etc.) to send to and/or receive from other servers instructions or content.

The parsed organizational structure may comprise a linked set of edges (e.g., an edge table), a tree of nodes, and/or other representations.

Figure 4:
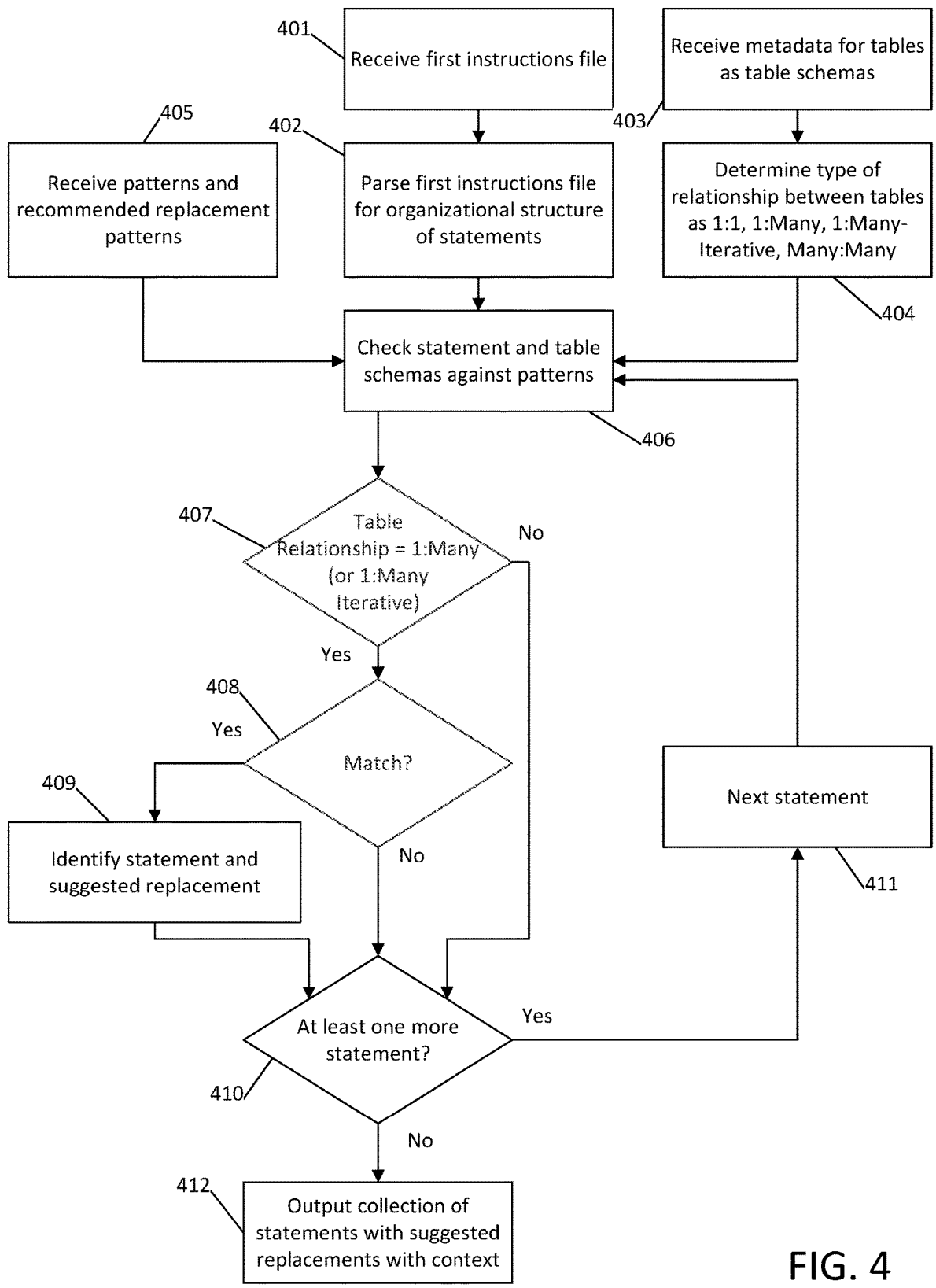
FIG. 4 depicts a flow chart for another method of combining data from source tables to create or modify a target table including checking relationships between tables.

FIG. 4 depicts a flow chart for another method of combining data from source tables to create or modify a target table including checking relationships between tables. In FIG. 4, the example process includes additional steps determining the structure of the combination of statements in the first instructions file. In step 401, the processor receives the first instruction file. In step 402 the first instructions file is parsed for an organizational structure of the statements contained therein. In step 403, metadata for the tables is received as table schemas. In step 404, the relationship between the tables, identified in the first instructions file, is determined. In step 405, the processor receives specific patterns and recommended replacement patterns. In step 406, the statements as parsed into the organizational structure are compared against the patterns identified in step 405 based on the relationships between the tables identified in step 404.

In step 407, if the table relationship is determined to be other than 1:Many or 1:Many Iterative, the process determines, in step 410, whether there is at least one more statement to be reviewed. If the table relationship is determined in step 407 to be 1:Many (or 1:Many Iterative), the processor attempts to match, in step 408, a statement or statements with the patterns. If a match has been found in step 408, the statement statements matching the pattern are identified along with one or more suggested replacements. The process determines, in step 410, whether at least one more statement is to be reviewed. If at least one more statement exists, in step 411 the process moves to the next statement and that statement is checked in step 406.

If no more statements are to be reviewed, the processor outputs, in step 412, a collection of statements (if any matches have been found) with suggested replacements within the context of the instructions.

Figure 5:
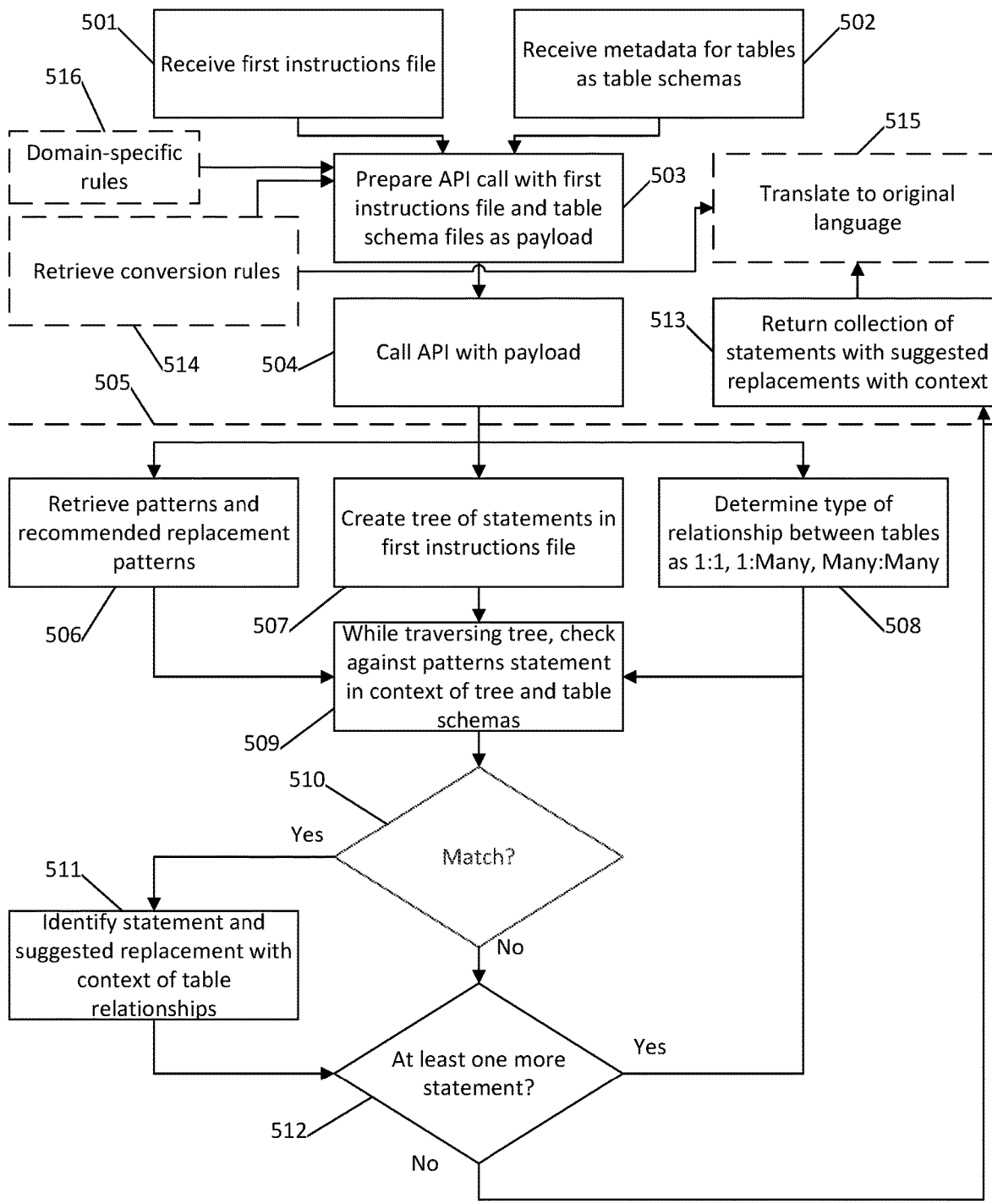
FIG. 5 depicts a flow chart for a method of calling an API to review an instruction file to create rows and columns in a target table.

FIG. 5 depicts a flow chart for a method of calling an API to review an instruction file to create rows and columns in a target table. In step 501, a first instructions file is received. In step 502, metadata for the tables is received as table schemas. In step 503, an API call is prepared with the first instructions file and the table schema as a payload. In step 504, the API is called with the payload attached (e.g., via a POST command or other command forwarding the payload with a call to a remote resource). Dashed line 505 represents a logical and/or physical separation between a calling server (e.g., one or more of servers 201, 202, and/or 203) and a called server (e.g., server 2017). In step 506, patterns and recommended replacement patterns are retrieved from a storage. In step 507, a tree of statements in the first instructions file is created. In step 508, the relationships between the types of tables is determined (1:1, 1:Many, Many:Many, 1:Many iterative, and the like). In step 509, the tree of statements is traversed and checked against the patterns of step 506. If a match is determined to exist in step 510, then the statement is identified along with its suggested replacement statement or combination of statements in the context of the existing table relationships and variables. After step 511 or if no match was found in step 510, the process determines in step 512 whether at least one more statement exists. If one more statement exists, then the traversing of the tree is continued in step 509. If no more statements exist in the tree, then the list of identified statements along with their suggested replacements (in the context of the original statement) is returned in step 513.

In a first instance of FIG. 5, the patterns are expressed in the same language as that of the first instructions file. Alternatively or additionally, conversion rules may be obtained in step 514 and applied in step 503 to translate the first instructions file (and possibly metadata of step 502, if a translation is needed) from a first language to a second language. In one example, translating the first instructions file into JSON may assist in the transmission of a representation of the first instructions file across boundary 505. The conversion rules may comprise an identification of an identification of two or more input language components of a first language, wherein the language components comprise one or more of statements, an identification of an input order between the two or more input language components, an identification of input values used by the two or more input language components, one or more output language components, and one or more output values. While written in a specific language, the first instructions file may be processed as a text file (or may be processed in a different language, e.g., C, C++, etc.).

The conversion rules may further comprise organization-specific rules regarding data substitutions to be made when translating the first instructions file. For example, one of the organization-specific rules may include, instead of using a date column from a source table, use a primary key from that source table to lookup a date in another source table for the relevant date. Other content may be looked up or modified as needed to address domain-specific idiosyncrasies of legacy data in various source databases. The domain-specific rules may be part of rules obtained in step 514 or may be provided separately and obtained in step 516.

Further, the conversion rules 514 may also be used to translate in step 515 the received collection (in step 513) of statements with suggested replacement statements in the context of the first instructions file.

For instance, the first language may be SQL (or C or C++ or any language in which database instructions are written) and the second language may be JSON (or XML, YAML, or other portable language). Using the same language may permit a reduction in translation errors that may occur when translating between different languages. On the other hand, translating to another language more suitable for a type of information exchange (e.g., using API calls with JSON content) may make exchanging content easier.

Figure 6:
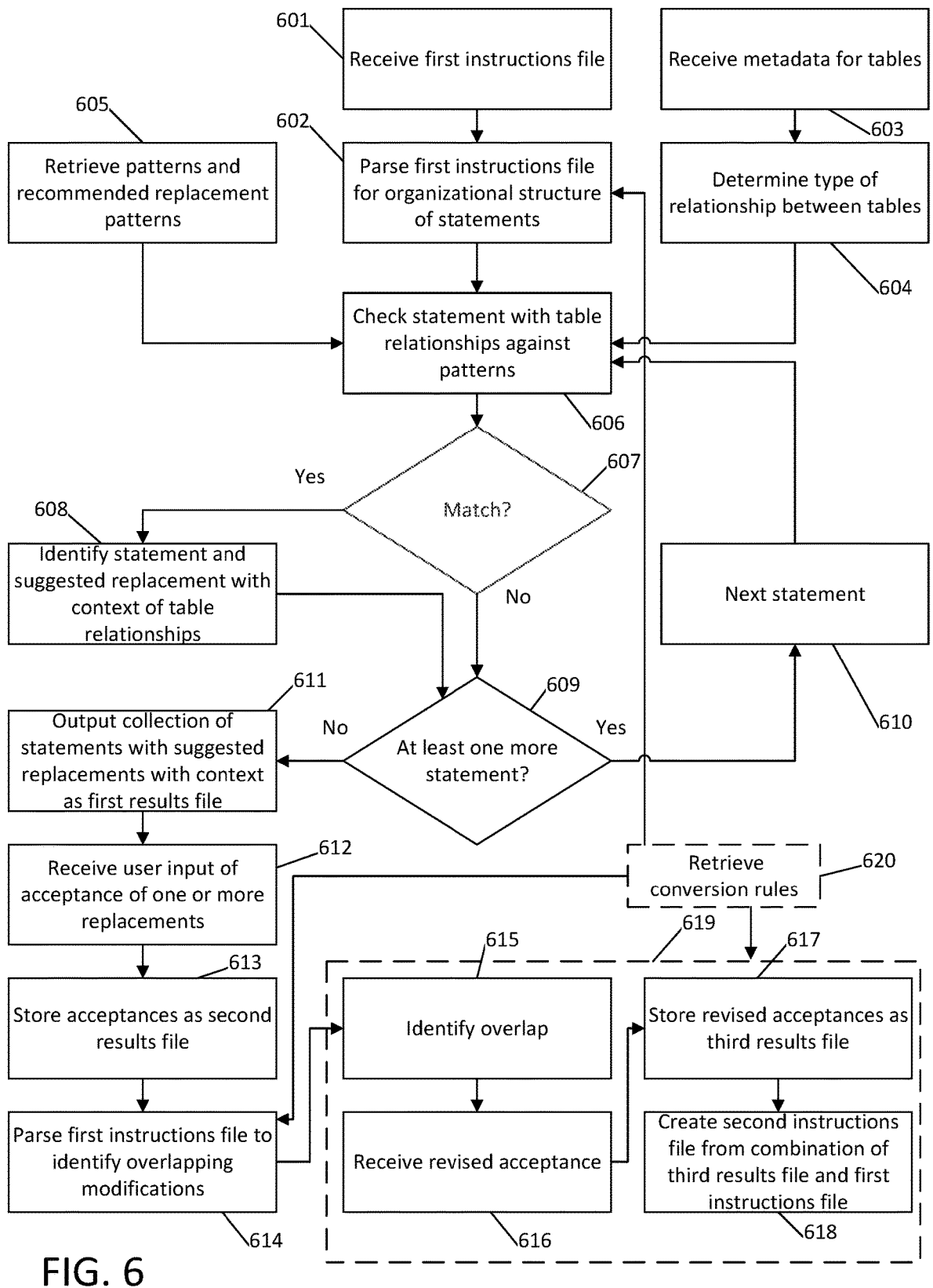
FIG. 6 depicts a flow chart for a method of modifying an instruction file and identifying overlapping acceptances of suggested modifications.

FIG. 6 depicts a flow chart for a method of modifying an instruction file and identifying overlapping acceptances of suggested modifications. In step 601, a first instructions file is received. In step 602, the statements in the first instructions file are parsed to obtain an organized structure of the statements (e.g., a tree). In step 603, metadata for the tables is received as table schemas. In step 604, the types of relationships between the tables is obtained. In step 605, patterns and recommended replacement patterns are retrieved from a storage. FIG. 6 may optionally include changing between languages (e.g., from SQL to JSON) as described with respect to FIG. 5 and the various conversion rules and domain-specific rules.

In step 606, the organized structure of the statements is checked against the patterns of step 605. If a match is determined to exist in step 607, then the statement is identified (in step 608) along with its suggested replacement statement or combination of statements in the context of the existing table relationships and variables. After step 608 or if no match was found in step 510 for a given statement or set of statements, the process determines in step 609 whether at least one more statement exists. If one more statement exists, then the process advances to the next statement in step 610 and the checking of the statements continues in step 606. If no more statements exist, then the list of identified statements along with their suggested replacements (in the context of the original statement) is output in step 611 (and stored as a first results file). For example, a user may be provided with the collection of identified statements. In step 612, the user's selection of whether to accept one or more suggested replacement patterns is received. In step 613, the user's selections are stored as a second results file. In step 614, the first instructions file is parsed to identify any selections by the user that would result in overlapping changes to the first instructions file.

For example, for a set of original statements that JOIN two tables in a 1:Many relationship, remove a number of columns, then de-duplicate the results, a first proposed replacement would be to remove the unwanted columns from the source or target table, de-duplicate that table, and then join the tables. Another proposed replacement may be to perform a lookup for row content in a source table (where a key value in that row corresponds to a key value in the target table) and then import the corresponding row content into the target table. In this example, if the user selects both options, the resulting changes to the first instructions file would conflict with other. In some situations, the changes would be merely duplicates of each other. In other situations, the combination of suggested changes may be impossible to implement as some suggested changes may be looking for content removed by a prior suggested change.

The overlap may be identified to the user in step 615. A revised set of acceptances may be received in step 616. In step 617, the revised acceptances may be stored in a third results file. In step 618, the third results file may be combined with the first instructions file to create a second instructions file. The second instructions file may include the statements from the first instructions file as modified with the accepted replacement statements from the third results file.

Where two or more languages are used (e.g., the first instructions file originally in SQL then translated to JSON and compared in JSON), The overlap may be apparent based on a comparison of the structure of the first instructions file with the user's accepted modifications added in. However, in some situations, it may be beneficial to translate the modified instructions file from the second language back into the first language before concluding that the accepted changes in fact overlap. For example, the conversion rules of FIG. 5 may be retrieved in step 620 and the instructions file in the second language may be translated to the first language in one or more of steps 614 or 619. Further, the rules of step 620 may also be used during the parsing of the first instructions file in step 602. Alternatively or additionally, the domain-specific rules of FIG. 5 may also be used in conjunction with the parsing and/or translation in FIG. 6.

FIG. 7 depicts an example of operations based on checking all rows before comparing content in each row. In FIG. 7, an instructions file converts all dates from a first format to a second format. After the conversion, each row is scanned, keeping only the rows with a date after a specified date. In the Source Table, each Date is identified by a RowID. The initial date format is "M/D/YY". To convert the date to a "YYYY-MM-DD" format, each row is scanned and the date converted, resulting in the First Resultant Table. For a 20 row table, all 20 rows are scanned (shown by the Full Table Scan count table next to the Source Table). Next, each row is compared against a target date (e.g., after "2017-01-01"). This results in another full table scan, represented by counts 21-40. The Second Resultant table provides only those rows matching the date query. In short, for a table of 20 rows, the table was fully scanned twice. If the time for performing an operation in a row is designated as time T, the time for stepping to a next row is often multiples of T (e.g., 5T, 10T, and the like). In this example, if stepping to each row is 10T, the total time to perform the operations of FIG. 7 may be 440T=Table scans 400T (=20 rows×2 passes through the table×10T)+Row operations 40T (20 rows×2 operations per row).

FIG. 8 depicts an example of operations based on checking content in a row while traversing all rows in a source table. FIG. 8 shows the same results but performed using a different order. For each row, two operations are being performed. First, the date format is converted. Second, the converted date is compared to the query (e.g., after "2017-01-01"). The total time to perform the operations in FIG. 8 is 240T=Table scans 200T (=20 rows×1 scan of the table× 10T)+Row operations 40T (2 operations per row×20 rows× T). In short, changing the order of operations from FIG. 7 to those of FIG. 8 results in an approximate reduction in computing time of 45%.

FIG. 9 depicts another example of operations based on checking all rows before comparing content in each row. In FIG. 9, each date's format is changed and two comparisons are performed per row. In short, FIG. 9 relates to the process used for FIG. 7 but with an additional final comparison. If stepping to each row is 10T, the total time to perform the operations of FIG. 9 may be 594T=Table scans 540T (=20 rows×2 passes through the table×10T+14 rows×1 pass through each row×10T)+Row operations 54T (20 rows×2 operations per row+14 rows×1 operation).

FIG. 10 depicts another example of operations based on checking content in a row while traversing all rows in a source table. FIG. 10 is based on the example of FIG. 8. The total time to perform the operations in FIG. 10 is 260T=Table scans 200T (=20 rows×1 scan of the table× 10T)+Row operations 60T (3 operations per row×20 rows× T). In short, changing the order of operations from FIG. 9 to those of FIG. 10 results in an approximate reduction in computing time of 52%.

Figure 11:
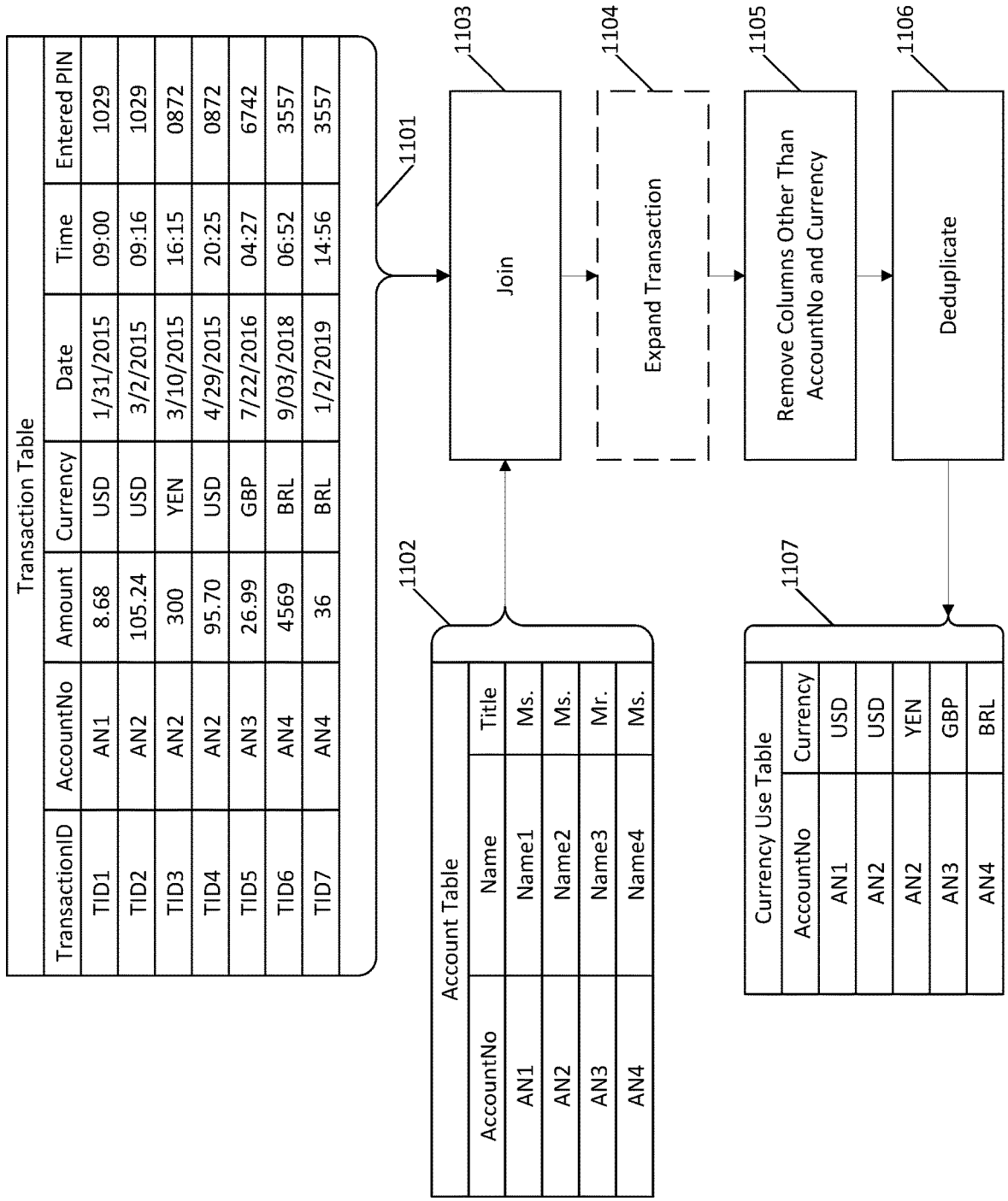
FIGS. 11 and 12 depict examples of joining two tables the removing columns and de-duplicating rows.
Figure 12:
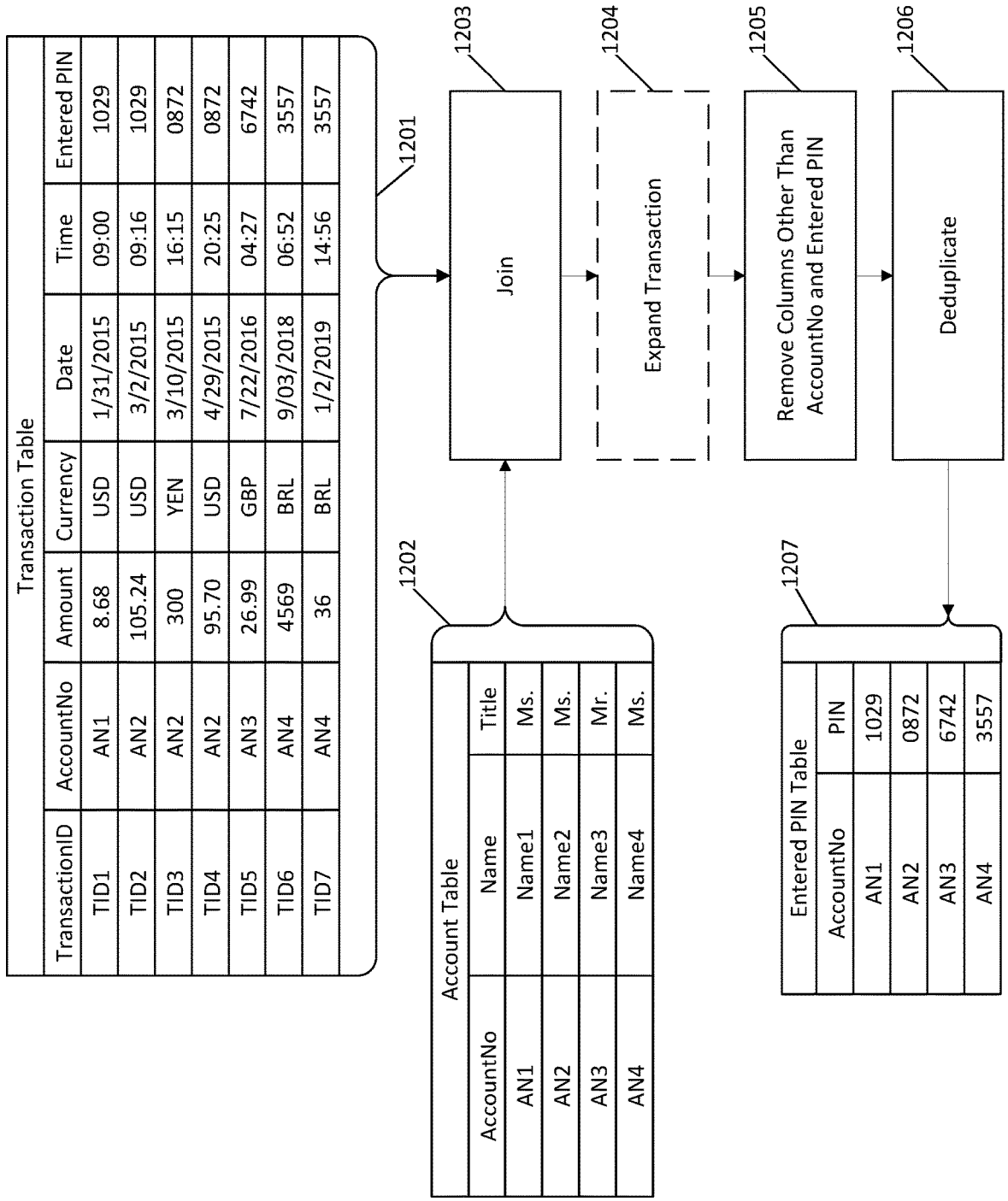

FIGS. 11 and 12 depict examples of joining two tables the removing columns and de-duplicating rows. In FIG. 11, a transaction table 1101 is joined (in step 1103) with account table 1102. Depending on the software and the handling of joined tables, the joined table may be expanded in step 1104. In step 1105, columns other than the AccountNo and Currency columns are removed. In step 1106, the columns are de-duplicated. Based on the Cartesian JOIN operation, the size of the JOINed table from the JOIN of step 1103 may be the number of rows of the Transaction Table (here, 7)×the number of rows in the Account Table (here, 4), resulting in a size of 28 rows and 9 columns. However, the desired Currency Use table is only 5 rows by 2 columns. In FIG. 12, only the Entered PIN Table is desired (4 rows by 2 columns).

Figure 13:
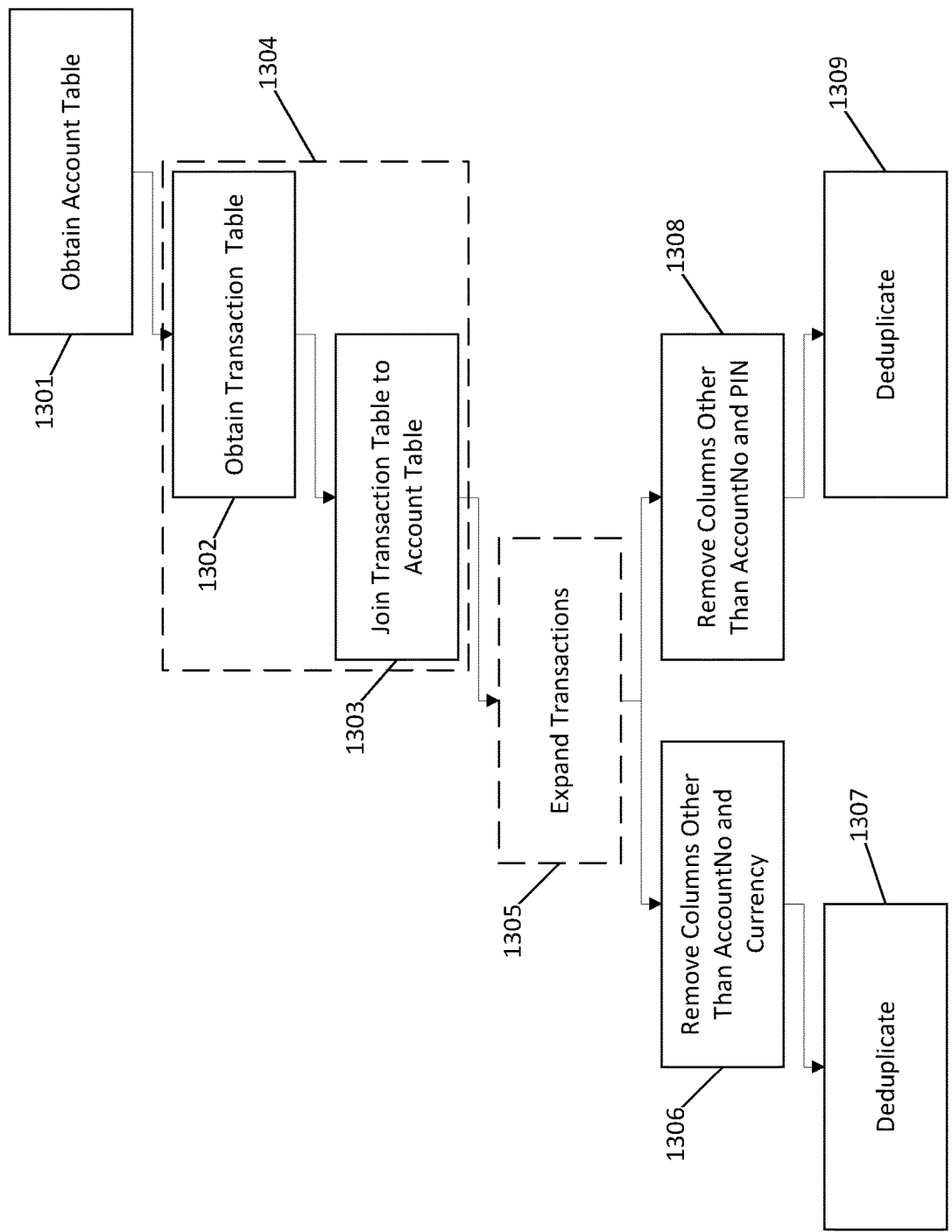
FIG. 13 depicts a tree diagram of the examples of FIGS. 11 and 12.

FIG. 13 depicts a tree diagram of the examples of FIGS. 11 and 12. In step 1301, the Account Table is obtained. In step 1302, the Transaction Table is obtained. In step 1303, the Transaction Table is JOINed to the Account Table. As shown by the dashed box, steps 1302 and 1303 may be combined into a single step 1304. In step 1305, if needed the Transaction Table may be expanded. In step 1306, columns other than the AccountNo and Currency columns are removed. In step 1307, the columns are de-duplicated. In step 1308, a separate version of the JOINed table has columns, other than the AccountNo and PIN columns, removed. In step 1309, the remaining columns are de-duplicated.

FIG. 14A depicts a pattern of operations. FIG. 14B depicts a first suggested alternative to the pattern of FIG. 14A. FIG. 14C depicts a second suggested alternative to the pattern of FIG. 14A. In FIG. 14A, an identified pattern includes a number of steps. In step 1401, obtain table A. In step 1402, obtain table B. In step 1403, JOIN table B to table A. In step 1404, remove column C. In step 1405, de-duplicate column D. FIG. 14B shows a suggested replacement operation where Table A is related to Table B as 1:Many. In step 1401, Table A is obtained. In step 1402, Table B is obtained. In step 1406, table Z is created based on filtered Table B. Table Z includes only columns other than column C (here, column C applied to FIGS. 11 and 12 refers to Transaction ID, Amount, Date, Time, and Entered PIN). In step 1407, the columns are de-duplicated. In step 1408, Table Z is JOINed to table A. FIG. 14C shows a suggested replacement pattern where the relationship between Table A:Table B is 1:1. Steps 1401 and 1402 are as described above. In step 1409, the process looks up a value in Table A and inserts it into Table B.

FIG. 15 depicts replacement operations from FIGS. 14B and 14C being applied to the examples of FIGS. 11 and 12. In step 1501, the Account Table is obtained. In step 1502, the Transaction Table is obtained. If the relationship between the two tables for the identified rows is 1:Many, then the suggested replacement of FIG. 14B is used. In step 1503, Table TC (transaction currency) is created with only the AccountNo and Currency columns. In step 1504, the columns are de-duplicated. In step 1506, Table TC is JOINed to the Account Table (as column TC and subsequently expanded if needed in step 1507).

Steps 1503 and 1504 may be combined as shown by dashed box 1505. Steps 1506 and 1507 may be combined as shown by dashed box 1508.

In step 1509, Table TP (Transaction Pin) is created from the Transaction Table with only the AccountNo and PIN columns. In step 1510, the columns are de-duplicated. In step 1512, Table TP is JOINed to Account Table (if relevant, as column TP and expanded in step 1513).

Steps 1509 and 1510 may be combined as shown by dashed box 1511. Steps 1512 and 1513 may be combined as shown by dashed box 1514.

If the relationship between the Account Table and the Transaction table for a given column is 1:1, then the replacement may be the replacement process of FIG. 14C. In step 1515, a lookup may be performed for the first non-blank PIN related to the Account No.

Figure 16:
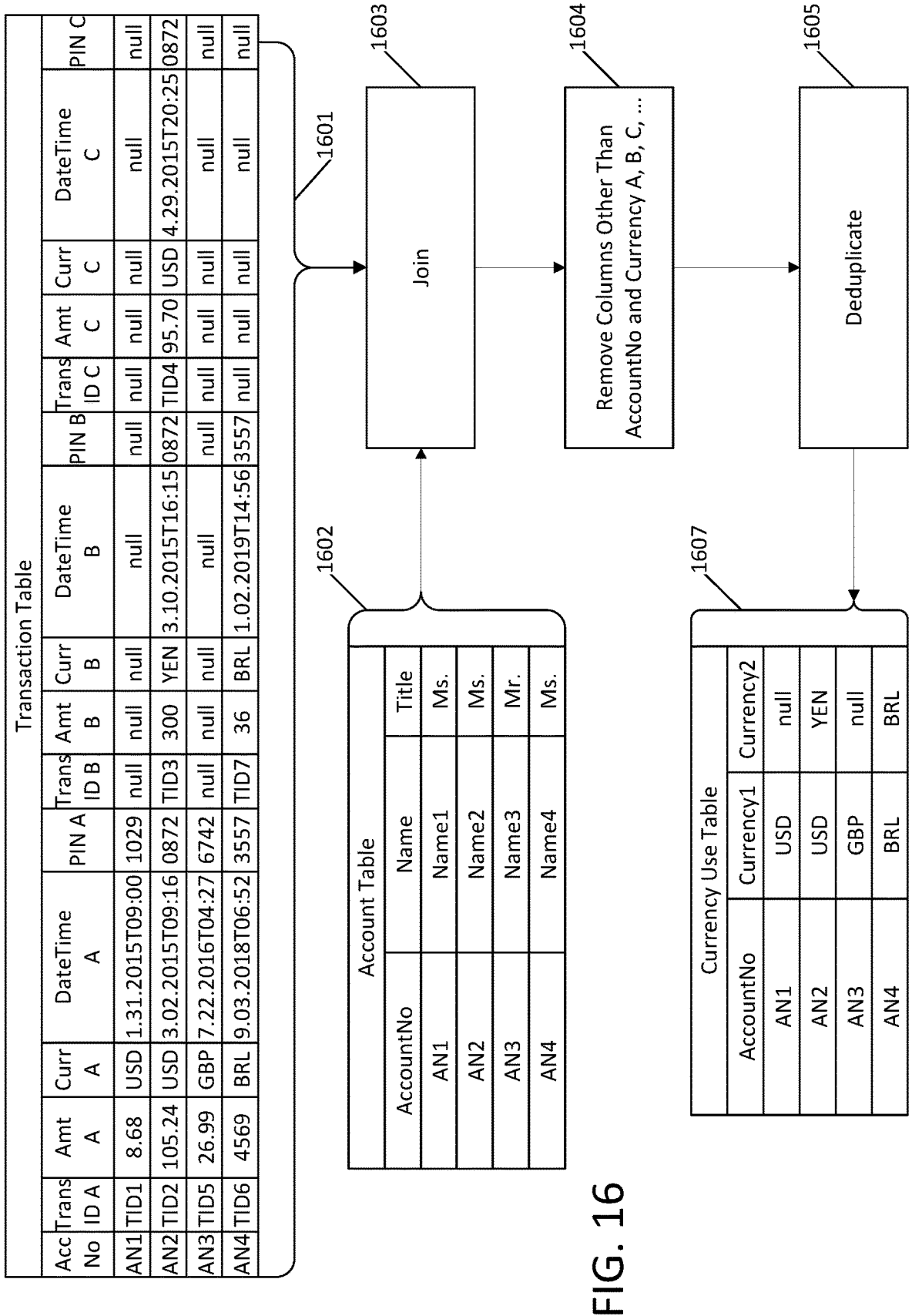
FIG. 16 depicts an example of operations between tables in a 1:Many Iterative relationship.

FIG. 16 depicts an example of operations between tables in a 1:Many Iterative relationship using the currency per account number as an example. A transaction table 1601 and account table 1602 are JOINed in step 1603. In step 1604, columns other than the account number and currency columns are removed. In step 1605, the columns are de-duplicated.

Figure 17B:
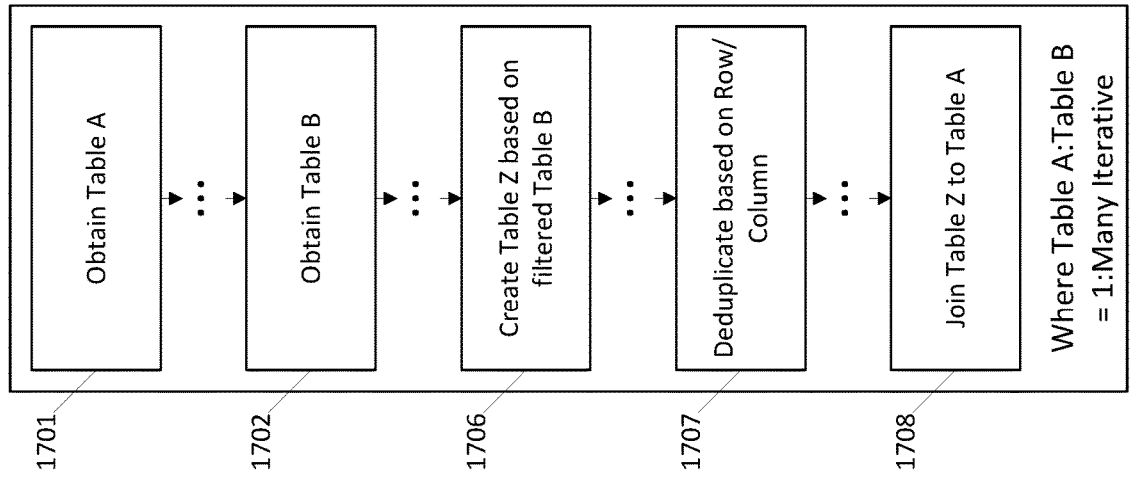
FIG. 17B depicts a first suggested alternative to the pattern of FIG. 17A.
Figure 17A:
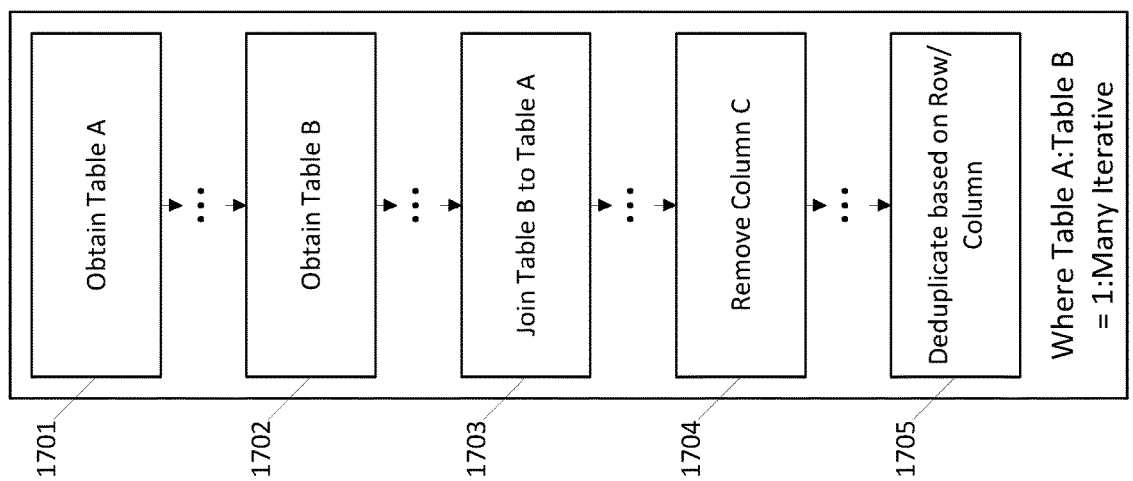
FIG. 17A depicts a pattern of operations that may appear between tables in a 1:Many Iterative relationship.

FIG. 17A depicts a pattern of operations that may appear between tables in a 1:Many Iterative relationship. FIG. 17B depicts a first suggested alternative to the pattern of FIG. 17A. In FIG. 17A, the pattern may be represented by obtaining table A (step 1701), obtaining table B (step 1702), JOINing table B to table A (step 1703), removing column C (step 1704), and de-duplicating based on rows and/or columns (step 1705). A replacement pattern may include obtaining table A (step 1701), obtaining table B (step 1702), creating (step 1706) table Z based on filtered table B (e.g., filtering on only specific columns having unique values), de-duplicating based on rows and/or columns (step 1707), and JOINing table Z to table Z.

Figure 18:
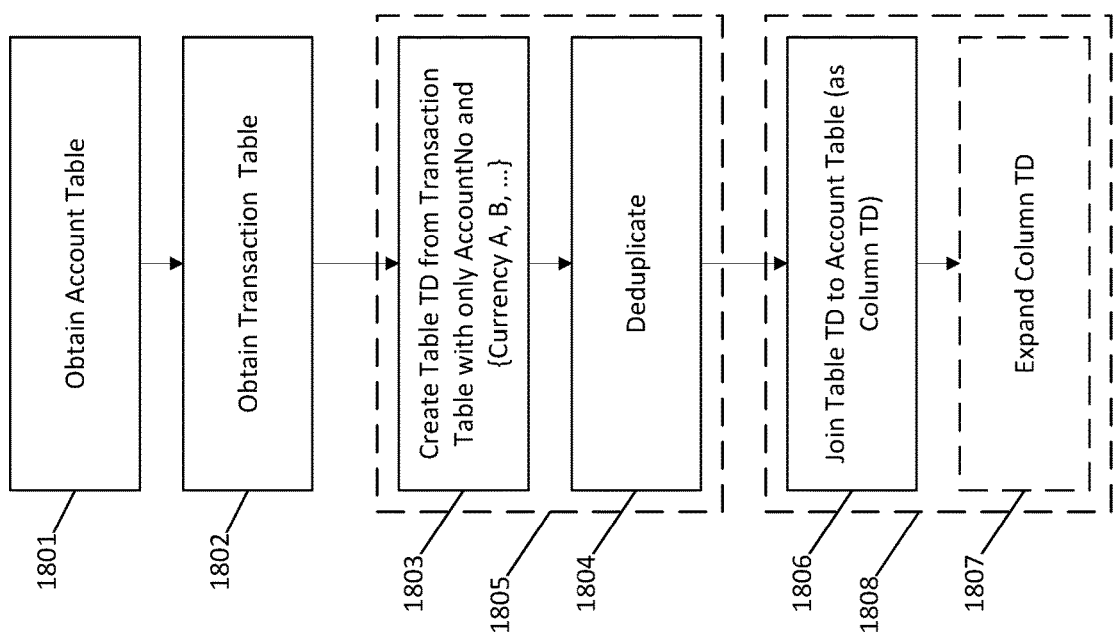
FIG. 18 depicts replacement operations from FIG. 17B being applied to the example of FIG. 16.

FIG. 18 depicts replacement operations from FIG. 17B being applied to the example of FIG. 16. In step 1801, the account table is obtained. In step 1802, the transaction table is obtained. In step 1803, table TD is created from the transaction table with only the AccountNo and currency columns (A, B, C . . . ). In step 1804, the columns are de-duplicated. In step 1806, table TD is JOINed to the Account Table (if relevant, as column TD and expanded in step 1807).

Steps 1803 and 1804 may be combined as shown by dashed box 1805. Steps 1806 and 1807 may be combined as shown by dashed box 1808.

Some aspects described herein may provide benefits for database conversion, such as: removing partitions from legacy databases while transitioning to cloud-based storage; correcting errors in conversion configuration files before the executing the files on entire databases; and improving the process for creating conversion configuration files through scanning files for templates then replacing code based on an iterative model instead of a sequential model for the code.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, from an authoring computing system, a first instructions file comprising first instructions in steps to generate content, when executed by one or more processors and based on content from a first table, as one or more columns of a second table in a target database, wherein at least one instruction of the first instructions comprises a join instruction to join the first table with a third table, wherein the first table and third table are from one or more source databases, wherein execution of the first instructions of the first instructions file is associated with a first computing time interval, and wherein the first instructions comprise functions and values;
parsing, based on a current step and previous steps, the first instructions file to identify an organizational structure of first instructions file including relationships between the first instructions, each function configured to operate on the content of the first table or the third table;
retrieving a collection of known patterns of two or more instructions and associated recommended replacement patterns replacing the two or more instructions with two or more replacement instructions having a different order of operations, wherein the known patterns comprise identification of the two or more instructions, wherein the known patterns further comprise organizational structures relating the two or more instructions;
identifying, based on the organizational structure of the instructions and the relationships between the first instructions of the first instructions file, one or more patterns of the instructions in the organizational structure that correspond to at least one of the known patterns;
generating, based on the identified one or more patterns, a first results file including
  the identified one or more patterns,
  the first instructions encompassed by the identified one or more patterns, and
  one or more suggested modifications to the first instructions encompassed by the identified one or more patterns having the different order of operations;
outputting, to the authoring computing system, the first results file;
receiving, based on the one or more suggested modifications in the first results file, a first user input indicating acceptance by a user of the one or more suggested modifications;
storing, based on the received first user input and as a second results file, a first list of the first user input;
determining one or more overlapping modifications between the first results file and the second results file;
generating, based on the overlapping modifications and second user input, a second instructions file comprising second instructions; and
generating, based on the second instructions file, the one or more columns of the second table,
wherein the second instructions comprise a selection of the one or more suggested modifications, and
wherein the generating the one or more columns of the second table is associated with a second computing time interval that is shorter than the first computing time interval based on a total time to perform the operations.

2. The computer-implemented method of claim 1, wherein the first results file and the second results file are JSON files.

3. The computer-implemented method of claim 1, further comprising:
generating, for the user based on determining the one or more overlapping modifications, a list of the one or more overlapping modifications; and
receiving, as a third results file, the second user input indicating revised acceptance of the one or more suggested modifications,
wherein the generating the second instructions file is further based on the third results file.

4. The computer-implemented method of claim 3, wherein determining the one or more overlapping modifications further comprises:
identifying at least two accepted modifications that would independently result in a common change and may both be implemented.

5. The computer-implemented method of claim 3, wherein determining the one or more overlapping modifications further comprises:
identifying at least two accepted modifications that would independently result in a common change and cannot both be implemented.

6. The computer-implemented method of claim 3,
wherein the second table comprises a schema, and
wherein determining the one or more overlapping modifications further comprises:
identifying alternative modifications to the schema of the second table.

7. The computer-implemented method of claim 3, wherein the generating the one or more columns of the second table further comprises:
combining the second results file and the third results file;
selecting proposed modifications from the first results file based on the combination of the second results file and the third results file;
generating, based on the selected proposed modifications, the second table with the one or more columns; and
storing the second table.

8. The computer-implemented method of claim 3, wherein the generating the one or more columns of the second table further comprises:
retrieving the first table;
combining the second results file and the third results file;
selecting proposed modifications from the first results file based on the combination of the second results file and the third results file;
generating, based on the selected proposed modifications, the one or more columns of the second table; and
storing the second table.

9. The computer-implemented method of claim 1, wherein the parsing the first instructions file to identify the organizational structure further comprises:
parsing the first instructions file to create a first tree of instructions.

10. The computer-implemented method of claim 9, wherein identifying, in the first instructions file, one or more patterns of the instructions in the organizational structure that correspond to at least one of the known patterns further comprises:

identifying, in the first tree of instructions, one or more patterns that correspond to at least one of the known patterns.

11. The computer-implemented method of claim 1, wherein the parsing the first instructions file to identify an organizational structure further comprises:
calling a first parsing function, via an application programming interface, and including the first instructions file as part of the call to the first parsing function.

12. The computer-implemented method of claim 11, wherein the generating the second instructions file further comprises:
calling, based on the first user input, a second parsing function, via an application programming interface, and including the first instructions file, the first results file, and the second results file to remove overlapping modifications accepted by the user; and
receiving, based on the call to the second parsing function, the second instructions file.

13. The computer-implemented method of claim 1, further comprising:
obtaining a first schema associated with the first table; and
obtaining a second schema associated with the third table, wherein identifying, in the first instructions file, the one or more patterns in the organizational structure that correspond to at least one of the known patterns further comprises:
identifying the one or more patterns based on the first instructions file, the first schema, and the second schema.

14. The computer-implemented method of claim 13, wherein identifying, based on the first instructions file, the first schema, and the second schema, the one or more patterns further comprises:
classifying a type of relationship between a first column of the first table and a second column of the third table as one of a one-to-one relationship, a one-to-many relationship, or a many-to-many relationship.

15. A system comprising:
a source database comprising a first table;
a target database;
a server comprising one or more processors and memory storing instructions that, when executed by the one or more processors, cause the system to:
receive, from an authoring computing system, a first instructions file comprising first instructions in steps to generate content, based on content from the first table, as one or more columns of a second table in a target database, wherein at least one instruction of the first instructions comprises a join instruction to join the first table with a third table, wherein the first table and third table are from one or more source databases, wherein execution of the first instructions of the first instructions file is associated with a first computing time interval, and wherein the first instructions comprise functions and values;
parse, based on a current step and previous steps, the first instructions file to identify an organizational structure of first instructions file including relationships between the first instructions, each function configured to operate on the content of the first table or the third table;
retrieve a collection of known patterns of two or more instructions and associated recommended replacement patterns replacing the two or more instructions with two or more replacement instructions having a different order of operations, wherein the known patterns comprise identification of the two or more instructions, wherein the known patterns further comprise organizational structures relating the two or more instructions;
identify, based on the organizational structure of the instructions and the relationships between the first instructions in the first instructions file, one or more patterns of the first instructions in the organizational structure that correspond to at least one of the known patterns;
generate, based on the identified one or more patterns, a first results file including
the identified one or more patterns,
the first instructions encompassed by the identified one or more patterns, and
one or more suggested modifications to the first instructions encompassed by the identified one or more patterns having the different order of operations;
output, to the authoring computing system, the first results file;
receive, based on the one or more suggested modifications in the first results file, a first user input indicating acceptance by a user of the one or more suggested modifications;
store, based on the received first user input and as a second results file, a first list of the first user input;
determine one or more overlapping modifications between the first results file and the second results file;
generate, based on the overlapping modifications and second user input, a second instructions file comprising second instructions; and
generate, based on the second instructions file, the one or more columns of the second table,
wherein the second instructions comprise a selection of the one or more suggested modifications, and
wherein the generation of the one or more columns of the second table is associated with a second computing time interval that is shorter than the first computing time interval based on a total time to perform the operations.

16. The system of claim 15, wherein the first results file and the second results file are JSON files.

17. The system of claim 15, wherein the instructions, when executed, further cause the server to:
generate, for the user based on determining the one or more overlapping modifications, a list of the one or more overlapping modifications; and
receive, as a third results file, the second user input indicating revised acceptance of the one or more suggested
wherein the instructions to generate the one or more columns of the second table are further based on the third results file.

18. The system of claim 17, wherein the instructions to determine the one or more overlapping modifications, when executed, further cause the server to:
identify at least two accepted modifications that would independently result in a common change and may both be implemented.

19. The system of claim 17, wherein the instructions to determine the one or more overlapping modifications, when executed, further cause the server to:

identify at least two accepted modifications that would independently result in a common change and cannot both be implemented.

20. One or more non-transitory media storing instructions that, when executed by one or more processors, cause the one or more processors to perform steps comprising:

receiving, from an authoring computing system, a first instructions file comprising first instructions in steps to generate content, based on content from a first table, as one or more columns of a second table in a target database, wherein at least one instruction of the first instructions comprises a join instruction to join the first table with a third table, wherein the first table and third table are from one or more source databases, wherein execution of the first instructions of the first instructions file is associated with a first computing time interval, and wherein the first instructions comprise functions and values;

parsing, based on a current step and previous steps, the first instructions file to identify an organizational structure of first instructions file including relationships between the first instructions, each function configured to operate on the content of the first table or the third table;

retrieving a collection of known patterns of two or more instructions and associated recommended replacement patterns replacing the two or more instructions with two or more replacement instructions having a different order of operations, wherein the known patterns comprise identification of the two or more instructions, wherein the known patterns further comprise organizational structures relating the two or more instructions;

identifying, based on the organizational structure of the first instructions and the relationships between the first instructions of the first instructions file, one or more patterns of the instructions in the organizational structure that correspond to at least one of the known patterns;

generating, based on the identified one or more patterns, a first results file including the identified one or more patterns, the first instructions encompassed by the identified one or more patterns, and one or more suggested modifications to the first instructions encompassed by the identified one or more patterns having the different order of operations;

outputting, to authoring computing system, the first results file;

receiving, based on the one or more suggested modifications in the first results file, a first user input indicating acceptance by a user of the one or more suggested modifications;

storing, based on the received first user input and as a second results file, a first list of the first user input;

determining one or more overlapping modifications between the first results file and the second results file;

generating, for the user, a list of the one or more overlapping modifications;

receiving, as a third results file, a second user input indicating revised acceptance of the one or more suggested modifications;

generating, based on the first results file, the second results file, and the third results file, a second instructions file; and generating, based on the second instructions file, the one or more columns of the second table, wherein the second instructions file comprises a selection of the one or more suggested modifications, and wherein the generating the one or more columns of the second table is associated with a second computing time interval that is shorter than the first computing time interval based on a total time to perform the operations.

\* \* \* \* \*